(12) United States Patent
Simon et al.

(10) Patent No.: US 11,388,629 B2
(45) Date of Patent: Jul. 12, 2022

(54) METHODS AND SYSTEMS FOR EXTENDING ATSC 3.0 PHYSICAL LAYER BROADCAST TO ENABLE CONVERGENCE WITH UNICAST 5G

(71) Applicant: Sinclair Broadcast Group, Inc., Hunt Valley, MD (US)

(72) Inventors: Michael J. Simon, Frederick, MD (US); Mark A. Aitken, Parkton, MD (US)

(73) Assignee: Sinclair Broadcast Group, Inc., Hunt Valley, MD (US)

( * ) Notice: Subject to any disclaimer, the term of this patent is extended or adjusted under 35 U.S.C. 154(b) by 204 days.

(21) Appl. No.: 16/697,976

(22) Filed: Nov. 27, 2019

(65) Prior Publication Data

US 2020/0178121 A1 Jun. 4, 2020

Related U.S. Application Data

(60) Provisional application No. 62/773,565, filed on Nov. 30, 2018.

(51) Int. Cl.
*H04W 28/06* (2009.01)
*H04W 72/04* (2009.01)
(Continued)

(52) U.S. Cl.
CPC ........... *H04W 28/065* (2013.01); *H04L 7/027* (2013.01); *H04W 72/0446* (2013.01); *H04N 5/3765* (2013.01); *H04W 84/042* (2013.01)

(58) Field of Classification Search
CPC ....... H04L 1/0007; H04L 25/00; H04L 7/027; H04M 3/53375; H04J 3/0635; H04J 3/0685; H04N 5/3765
See application file for complete search history.

(56) References Cited

U.S. PATENT DOCUMENTS

| 9,438,459 B2 | 9/2016 | Simon et al. |
| 9,762,347 B2 | 9/2017 | Shelby et al. |
(Continued)

OTHER PUBLICATIONS

"ATSC Standard: ATSC 3.0 System (A/300)", Oct. 19, 2017, pp. 1-56 (Year: 2017).*

(Continued)

*Primary Examiner* — Salvador E Rivas
(74) *Attorney, Agent, or Firm* — Sterne, Kessler, Goldstein & Fox P.L.L.C.

(57) ABSTRACT

The ATSC 3.0 physical layer broadcast standard is extended with new OFDM numerology, L1 signaling and frame structure aligned with 5G. This is done to enable improved broadcast mobility and convergence 5G release 16 as a Non-3GPP access network. The 5G core network and Broadcast core network interwork over defined interfaces to enable convergence layer 3. This enables improvements of broadcast physical layer for physics of broadcast. The 5G unicast physical layer is enhanced for physics of unicast, and then both are converged at layer 3. This is novel and has many benefits compared to the legacy LTE broadcast method (e.g., Evolved Multimedia Broadcast Multicast Services (eMBMS)), which combines both broadcast and unicast into a single shared LTE frame at layer 1. The eMBMS method is then improved for dominate unicast mode in shared L1 frame. The result is the broadcast performance and efficiency in eMBMS are less than optimal.

20 Claims, 28 Drawing Sheets

(51) Int. Cl.
    *H04L 7/027*       (2006.01)
    *H04W 84/04*     (2009.01)
    *H04N 5/376*     (2011.01)

(56)           References Cited

U.S. PATENT DOCUMENTS

| | | |
|---|---|---|
| 9,843,845 B2 | 12/2017 | Aitken et al. |
| 9,853,851 B2 | 12/2017 | Simon et al. |
| 9,866,421 B2 | 1/2018 | Simon et al. |
| 10,033,566 B2 | 7/2018 | Simon et al. |
| 10,079,708 B2 | 9/2018 | Simon et al. |
| 2016/0105862 A1* | 4/2016 | Charbit ............. H04W 56/0015 370/336 |
| 2017/0295409 A1 | 10/2017 | Simon et al. |
| 2018/0062820 A1 | 3/2018 | Simon |
| 2018/0317055 A1* | 11/2018 | Shelby ............... H04N 21/6125 |
| 2020/0328927 A1* | 10/2020 | Park ..................... H04L 1/0057 |

OTHER PUBLICATIONS

"ATSC Recommended Practice: Guidelines for the Physical Layer Protocol (A/327)", Oct. 2, 2018, pp. 1-128 (Year: 2018).*
International Search Report and Written Opinion dated Feb. 11, 2020, European Patent Office, The Netherlands, 12 pages.

\* cited by examiner

| F(s) | # Samples 1ms | ΔF Hertz | Slot Size ms | Tu # Samples | CP # Samples | Tu + CP # Samples | # Symbols 1ms | Actual Tu + CP Samples Sub-frame | # Samples Deficit 1ms |
|---|---|---|---|---|---|---|---|---|---|
| 61.44 | 61440 | 15,000 | 1 | 4096 | 288 | 4384 | 14 | 61376 | 64 |
| 122.88 | 122880 | 30,000 | 0.5 | 4096 | 288 | 4384 | 28 | 122752 | 128 |
| 245.76 | 245760 | 60,000 | 0.25 | 4096 | 288 | 4384 | 56 | 245504 | 256 |
| 491.52 | 491520 | 120,000 | 0.125 | 4096 | 288 | 4384 | 112 | 491008 | 512 |
| 983.04 | 983040 | 240,000 | 0.0625 | 4096 | 288 | 4384 | 224 | 982016 | 1024 |

FIG. 6

$$Frame\ Length\ ms = \frac{1024}{2^N} \times 10ms\ [N = 2, 3, 4, 5, 6, 7, 8, 9, 10]$$ ←—1306

| N | ATSC 3.0 Frame Length (ms) | ATSC 3.0 Frames SFN Period (10240ms) |
|---|---|---|
| 2 | 2560 | 4 |
| 3 | 1280 | 8 |
| 4 | 640 | 16 |
| 5 | 320 | 32 |
| 6 | 160 | 64 |
| 7 | 80 | 128 |
| 8 | 40 | 256 |
| 9 | 20 | 512 |
| 10 | 10 | 1024 |

FIG. 13B

METHODS AND SYSTEMS FOR EXTENDING ATSC 3.0 PHYSICAL LAYER BROADCAST TO ENABLE CONVERGENCE WITH UNICAST 5G

CROSS-REFERENCE TO RELATED APPLICATIONS

This application claims priority under 35 U.S.C. § 119(e) to U.S. Provisional Patent Application No. 62/773,565 titled "ATSC 3.0 Physical Layer Extensions to Enable Mobility Broadcast 5G Convergence" and filed on Nov. 30, 2018, which is hereby incorporated by reference in its entirety for all purposes. This application is related to U.S. Pat. No. 9,843,845 issued Dec. 12, 2017; U.S. Pat. No. 10,079,708 issued Sep. 18, 2018; U.S. Pat. No. 9,762,347 issued Sep. 12, 2017; U.S. Pat. No. 9,438,459 issued Sep. 6, 2016; U.S. Pat. No. 9,853,851 issued Dec. 26, 2017; U.S. Pat. No. 9,866,421 issued Jan. 9, 2018; U.S. Pat. No. 10,033,566 issued Jul. 24, 2018; U.S. Patent Application Publication No. 2018/0062820 published on Mar. 1, 2018; and U.S. Patent Application Publication No. 2017/0296409 published Oct. 12, 2017, all of which are herein incorporated by reference in their entireties for all purposes.

BRIEF SUMMARY

In one aspect/embodiment, a method is disclosed. The method includes determining a frame length to cause an integer number of a plurality of broadcasting frames in a system frame number (SFN) period. The method includes synchronizing the plurality of broadcasting frames with respect to a clock. The method includes splitting internet protocol (IP) content flows into a plurality of baseband frames to transmit to at least one user equipment (UE). The method also includes transmitting a first baseband frame of the plurality of baseband frames over a unicast radio access network, and transmitting a second baseband frame of the plurality of baseband frames over a broadcast network. A second content in the second baseband frame can be associated with a first content in the first baseband frame.

The transmitting the first baseband frame includes transmitting the first content that includes an enhancement layer content associated with the second content. The synchronizing the plurality of broadcasting frames includes synchronizing the plurality of broadcasting frames with an international atomic time (TAI) network clock. The method further includes inserting a timestamp and associated metadata within an extended preamble of the second baseband frame. The timestamp can be based on international atomic time (TAI).

For the determining the frame length to cause the integer number of the plurality of broadcasting frames, the method includes determining the SFN period as 10,240 ms and the frame length as 160 ms. For the determining the frame length to cause the integer number of the plurality of broadcasting frames, the method includes determining the SFN period as 10,240 ms and the frame length as 80 ms. The transmitting the second baseband frame over the broadcast network includes transmitting the second baseband frame over Advanced Television Systems Committee (ATSC) 3.0 standard network. The transmitting the first baseband frame over the unicast radio access network includes transmitting the first baseband frame over 5G wireless network.

The method further includes coordinating the 5G wireless network and the ATSC 3.0 standard network to generate the first baseband frame and the second baseband frame. The splitting interne protocol (IP) content flows into the plurality of baseband frames includes offloading traffic from the 5G wireless network to the ATSC 3.0 standard network.

In a second embodiment, an apparatus is disclosed. The apparatus includes a first receiver configured to receive a first frame. The first frame can be generated at unicast radio access network and can be aligned with respect to a clock. The apparatus further includes a second receiver configured to receive a second frame. The second frame can be generated at a broadcast network and can be aligned with respect to the clock. The apparatus also includes a processor that is configured to determine a first content from the first frame, a second content from the second frame, and associate the second content with the first content. The processor is further configured to coordinate the 5G wireless network and the ATSC 3.0 standard network based on timestamp and associated metadata within an extended preamble of the second frame. The processor is further configured to establish a second clock based on the timestamp and the associated metadata.

The first receiver includes a 3rd Generation Partnership Project (3GPP) receiver and the second receiver includes a non-3GPP receiver. The first content includes an enhancement layer content associated with the second content and the clock includes an international atomic time (TAI) network clock. The broadcast network includes Advanced Television Systems Committee (ATSC) 3.0 standard network, and the unicast radio access network includes 5G wireless network.

In a third embodiment, a communication system is disclosed. The communication system includes a scheduler of a wireless radio access network configured to generate a first frame. The first frame can be aligned with respect to a clock. The clock includes an international atomic time (TAI) network clock. The communication system includes a transmitter of the wireless radio access network configured to transmit the first frame to a user equipment (UE), and a scheduler of a broadcast network configured to generate a second frame. The second frame can be aligned with respect to the clock. The communication system includes a transmitter of the broadcast network configured to transmit the second frame to the UE. The first frame includes first content and the second frame includes second content. The second content can be associated with the first content. The broadcast network includes Advanced Television Systems Committee (ATSC) 3.0 standard network, and the unicast radio access network includes 5G wireless network. The scheduler of the ATSC 3.0 standard network is further configured to coordinate the 5G wireless network and the ATSC 3.0 standard network based on a timestamp and associated metadata within an extended preamble of the second frame.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. Elements shown as a single component can be replaced with multiple components, and elements shown as multiple components can be replaced with a single component. The drawings are not to scale, and the proportion of certain elements can be exaggerated for illustration.

FIG. 6 illustrates exemplary 5G excess samples in time domain, according to some aspects/embodiments.

FIG. 13b illustrates a relationship between ATSC 3.0 Extended frame length and ATSC 3.0 Extended frames SFN period, according to some aspects/embodiments.

DETAILED DESCRIPTION

Figure 1:
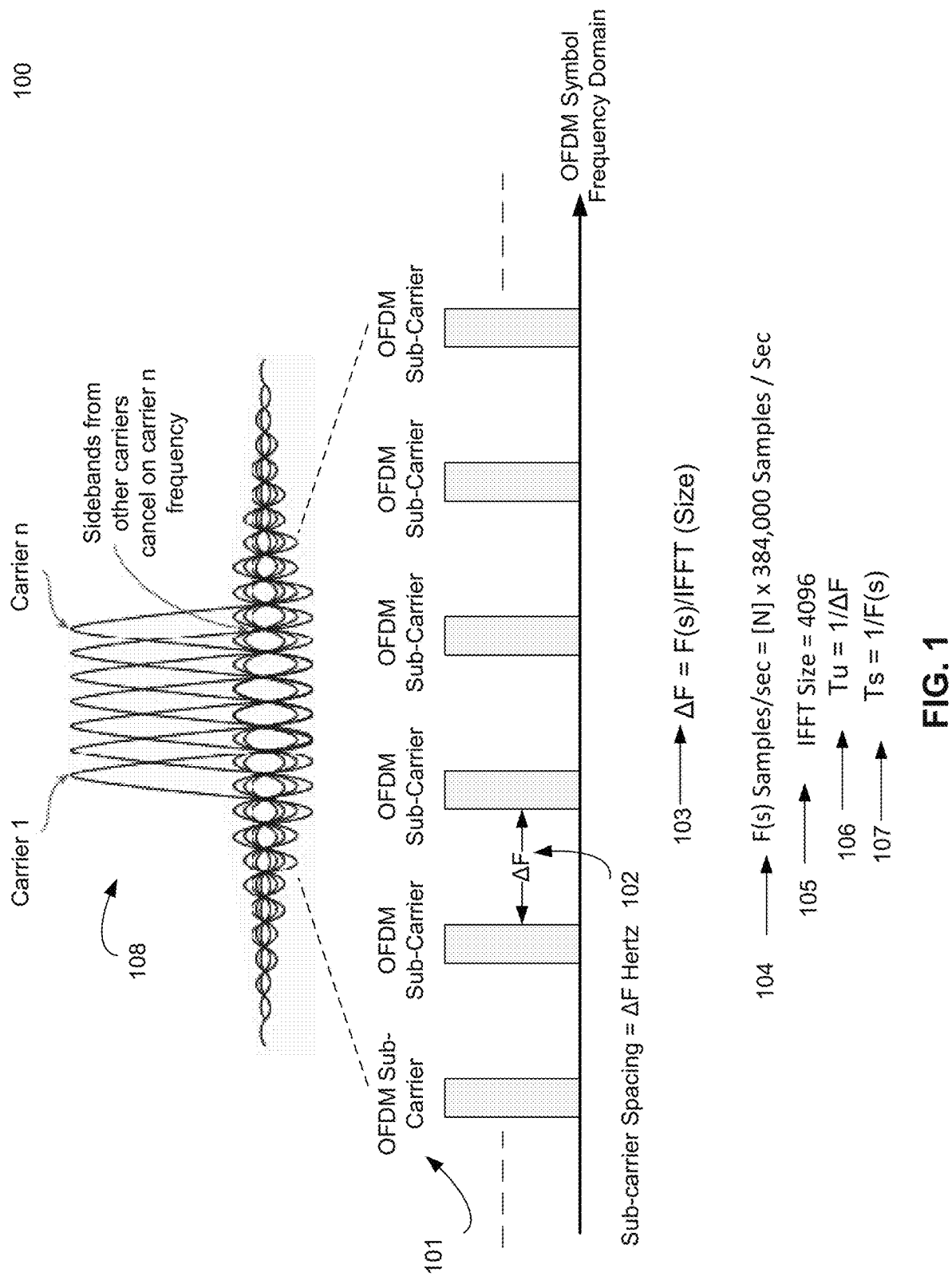
FIG. 1 illustrates an exemplary 5G OFDM numerology in frequency domain, according to some aspects/embodiments.

This disclosure is directed to the extensions used to enable the ATSC 3.0 (Advanced Television Systems Committee) Standard physical layer for mobility and 5G convergence. This includes extensions to the Orthogonal frequency-division multiplexing (OFDM) Numerology, L1 Signaling and Frame structure of the ATSC 3.0 standard. This is to enable mobility and convergence of broadcast as a Non-3GPP Access Network as envisioned in 3GPP TS 22.261 5G Release 16. The extensions to 5G Core network to enable the broadcast physical layer ATSC 3.0 are discussed in this disclosure.

The reference patents and publications cited above contain concepts used as contributions into the ATSC 3.0 standard process and have been incorporated into ATSC 3.0 standard A/321, A/322. These patents and publications are now used as a basis to propose extensions to the ATSC 3.0 physical layer in a scalable way. The extensions of ATSC 3.0 physical layer are designed to be scalable and received by a software defined radio (SDR) demodulator chip. This new flexibility is used to support broadcast mobility and 5G convergence.

The ATSC 3.0 physical layer standard documents denoted by A/321 and A/322 were adopted into the FCC rules. The FCC rulemaking permits voluntary use by broadcasters. The FCC also permitted broadcast innovation in a free market manner based on A/321 and A/322. These extensions can lead to innovation such as mobility and Broadcast 5G Convergence.

The above referenced patents and publications refer to existing technology in A/321, A/322 that will be used a baseline and extended for mobility and convergence. The ATSC 3.0 standard documents are publicly available at www.atsc.org/standards/atsc-3-0-standards/.

The ATSC 3.0 standard was designed for Next Generation Broadcast Television (e.g., Ultra-high-definition television) UHDTV and broadband connectivity having an IP (Internet Protocol) transport. The ATSC 3.0 physical layer supports modest speeds for mobility, which can not be within 3GPP (3rd Generation Partnership Project) for 5G. The extensions to be disclosed explicitly position the ATSC 3.0 physical layer for Mobility and 5G convergence. The OFDM Numerology will be extended to enable greater mobile speeds, higher frequency bands and wider channel bandwidth choices. The L1 signaling A/321 and A/322 will enable the choice of multiple OFDM waveforms (flexibility) in future. The ATSC 3.0 physical frame structure will be extended and time aligned and associated (via extended L1 signaling) to the fixed 10 ms frame structure and cadence of both 4G/5G. Both the ATSC 3.0 and 5G network infrastructure systems use a global network clock (TAI (international atomic time)) for timing. This is leveraged to enable tight time convergence with the Dual Simultaneous Connectivity of user equipment (UE) (3GPP/Non-3GPP) in Release 16, which supports Non-3GPP access networks and in which broadcast is being positioned from a 3GPP perspective.

In some aspects/embodiments, with the advancement of technology and new system architectures in 5G, the Unicast Physical Layer is adjusted separately for unicast and the broadcast physical layer is adjusted for broadcast separately and then converged at the IP layer. In the legacy 4G LTE (Long-Term Evolution) the unicast and broadcast share the same physical layer frame and allow for Mixed Mode (Unicast/Broadcast) using time division multiplexing with the technology known as LTE eMBMS (Evolved Multimedia Broadcast Multicast Services). The legacy LTE 4G broadcast physical layer was not explicitly for broadcast. Because LTE broadcast is shared with unicast in the same frame it offers less than ideal performance and spectrum efficiency for broadcast because unicast is the dominate mode being adjusted.

The opportunity with the new 5G release 16 standards by 2020 is to offer for the first time the option to design broadcast on a separate frequency as a Non-3GPP access network and then converge with unicast at IP layer and at the UE. The 3GPP has given lower priority to broadcast in the initial releases 5G. The focus of this disclosure is to extend ATSC 3.0 physical layer and present a contribution to 3GPP in future and to improve the broadcast mobile performance.

The new ATSC 3.0 OFDM Numerology is first discussed. The OFDM Numerology (Frequency Domain) determines parameters such as (inverse fast Fourier transform (IFFT) size) and the OFDM sub-carrier spacing ($\Delta F$ in Hz). Increasing the size of the $\Delta F$ value can improve Doppler performance (Mobility) and tolerance to phase noise. The higher frequency bands and larger the useful channel bandwidth possible, etc. The OFDM Numerology (Time Domain) determines such things as useful symbol length (Tu) and cyclic prefix (CP) of the OFDM symbol, which determines the delay spread tolerance for echoes and spacing (distance) possible between transmitter sites in Single Frequency Network (SFN) topology. The comparison of ATSC 3.0 (extended) and the 3GPP 5G physical layer numerology is presented to get context in terms of mobility and convergence in 3GPP.

Next, the A/321 (bootstrap) signal is discussed. The bootstrap signal begins every ATSC 3.0 frame. Bootstrap signal is discussed in, for example, U.S. Pat. No. 10,079,708 issued Sep. 18, 2018, incorporated herein by reference in its entirety. Specifically, the A/321 Bootstrap signal is a universal entry point consisting of several (Zadoff Chu+pseudo-noise PN) OFDM symbols. These symbols have excellent cross correlation properties located at the beginning of each broadcast frame. In some aspects/embodiments, the receiver knows the Zadoff Chu "Root" (0-1498) and the PN Seed (1 of 65,536) combination to successfully correlate and synchronize to the transmitted signal. According to some aspects of this disclosure, this enables waveform discovery based on the specific (Root+Seed) value combination used, each indicating a new OFDM optimized waveform type for mobility and/or convergence. Thousands of (Root+Seed) value combination (waveforms) are possible to signal by extension. The bootstrap symbols also carry low level signaling to enable a receiver to discover and then demodulate the following post bootstrap symbols of a waveform frame. The A/321 syntax and semantics will be extended for mobility and 5G convergence.

Then to enable tight broadcast 5G convergence experience at the receiver UE the ATSC 3.0 physical frame structure is discussed. The ATSC 3.0 transmitted frame structure will be extended by, for example, being time aligned to the fixed 4G/5G 10 ms frame structure cadence, and this scheduling orchestration is signaled to UE by extended L1 signaling. The timing reference point is at the air interface of the respective transmit antennas in the converged network. The respective physical layer schedulers broadcast/5G can be orchestrated (coordinated) for convergence, and this relationship is signaled to the converged receiver, which has dual reception capability enabled in 5G Release 16. Both the ATSC 3.0 and 5G systems use a global network clock (TAI) for timing. The existing L1 signaling in 5G on frame cadence System Frame Number (SFN) is leveraged for ATSC 3.0 extended L1 signaling of converged receiver.

The tight time coordination and signaling for the RF transmitted frames is possible even though the broadcast and 5G unicast are on separate frequencies. They share a common mathematical relationship by design for OFDM numerology and a common TAI clock for synchronization. This attention to detail can improve the quality of service and the potential use cases in the future for broadcast and 5G convergence.

Unicast and Broadcast Physics Diversity

The diverse nature (Physics) of the unicast 5G and broadcast physical layers are discussed briefly for context and seen as complementary when converged at IP layer in a Broadcast 5G Convergence network architecture.

First, unicast physics encourages a unicast service operator to use a small cell size topology. One constraint is battery powered UE used for uplink back to base station. When UE is several feet above the ground or indoors this is a real physics challenge and grows worse at higher frequency bands and with increased distance to the base station. Moreover, using a larger cell size can result in a larger number of UE in this larger area. This would increase the contention for available OFDM resources leading to congestion in the network.

The next constraint on cell size is each 5G cell re-uses the same frequency and this can cause inter-cell interference between adjacent cells. The base station antennas are placed lower on the tower and have downward beam tilt to limit the propagation distance of signal to mitigate inter-cell interference.

The trend in 5G is to use high frequency bands (for example, 28 GHz and higher up to 100 GHz) in future releases. The physics at these higher frequency bands results in smaller OFDM symbol sizes in time domain as will be discussed and this limits the cell possible. However, 5G service is optimized for unicast and the mobile network operator (MNO) business model is selling capacity bits used in a plan to consumers. The smaller the cell size the larger the number of cells the larger the possible data rate to the largest number of users. The increase in cost in deployment of more cells is the calculus for the business of unicast and 5G. For these reasons, 5G unicast systems use small cell topologies as we will describe later when discussing OFDM numerology 5G.

However, with broadcast physics the distance of UE to a broadcast transmitter is not a constraint. In some examples, for broadcast there is no uplink, only a downlink, and the broadcast are designed to be received by many receivers not just a single receiver as in unicast. The idea in broadcast is to use the advantage of higher height antennas on towers, which can overcome the ground clutter and get the signal down into areas the signaled normally would be shadowed (blocked) with lower antenna height placements.

The height advantage is desired in broadcast, the transmit power is then selected to provide a uniform field strength into a service area and provide for indoor building penetration, which is possible at the lower broadcast frequencies propagation physics. The number of transmitters to provide service with a coherent signal emitted simultaneously from several transmitter sites in a single frequency network is a function of terrain and amount of shadowing (natural or manmade) that is to be mitigated.

The broadcast single frequency network is a frequency re-use scheme where the adjacent transmitters sites are synchronized and overlapping signals coherently add to improve the signal strength. The broadcast physics are totally different than the adjacent cell sites in unicast in which the signals addition can cause interference.

In general, the quality of service, spectrum efficiency and the economics (Infrastructure) is improved for a broadcast network that is optimized for the physics of broadcast.

The Physics of unicast and broadcast are so diverse each are optimized separately for their respective physics and then converged at the IP layer 3.

FIG. 1 is the 3GPP 5G OFDM symbol numerology for release 16 shown in the frequency domain, according to some aspects/embodiments. The graph 108 shows an Orthogonal Frequency Division Multiplexing (OFDM) waveform in the frequency domain. The equation 103 shows the sub-carrier spacing ΔF (Hz) 102 for achieving orthogonality between adjacent sub-carriers shown in graph 108 by having sidebands frequency domain cancel (orthogonality). This cancellation of sidebands is due to this mathematical relationship 103 and can be achieved easily in the digital domain. The sub-carrier spacing ΔF (Hz) 102 is a function of F(s) sampling frequency 104 and the IFFT size 105. FIG. 1 provides example values for sampling frequency F(s) and IFFT size. However, the embodiments of this disclosure are not limited to these examples and other values can also be used.

Larger sized sub-carrier spacing ΔF (Hz) 102 results in improved OFDM Doppler performance (speed for mobility use) and less susceptibility to phase noise at the receiver. Both can be a problem at higher frequency bands of operation for 5G, therefore the sub-carrier spacing ΔF (Hz) will be increased to accommodate higher frequency bands in the higher GHz range up to 100 GHz in release 17.

The 5G sampling frequency F(s) equation 104 is based on the 0.384 M samples/sec and the variable factor (N). Accordingly, sampling time Ts can be calculated based on an equation 107 as 1 divided by the sampling frequency F(s). In 5G the IFFT size 105 equation can be fixed to a single value 4096. Therefore, the equations 103 will have an increase in sampling frequency F(s) 104 to increase the sub-carrier spacing ΔF 102 and to allow for improved mobility at the higher frequency bands used in 5G. An equation 106 represents a useful part of the OFDM symbol can be calculated as 1 divided by the sub-carrier spacing ΔF 102. The useful part of the OFDM symbol Tu is discussed in detail below. As noted above, these values are provided as examples, and the aspects/embodiments of this disclosure are not limited to these examples and other values can also be used.

Figure 2:
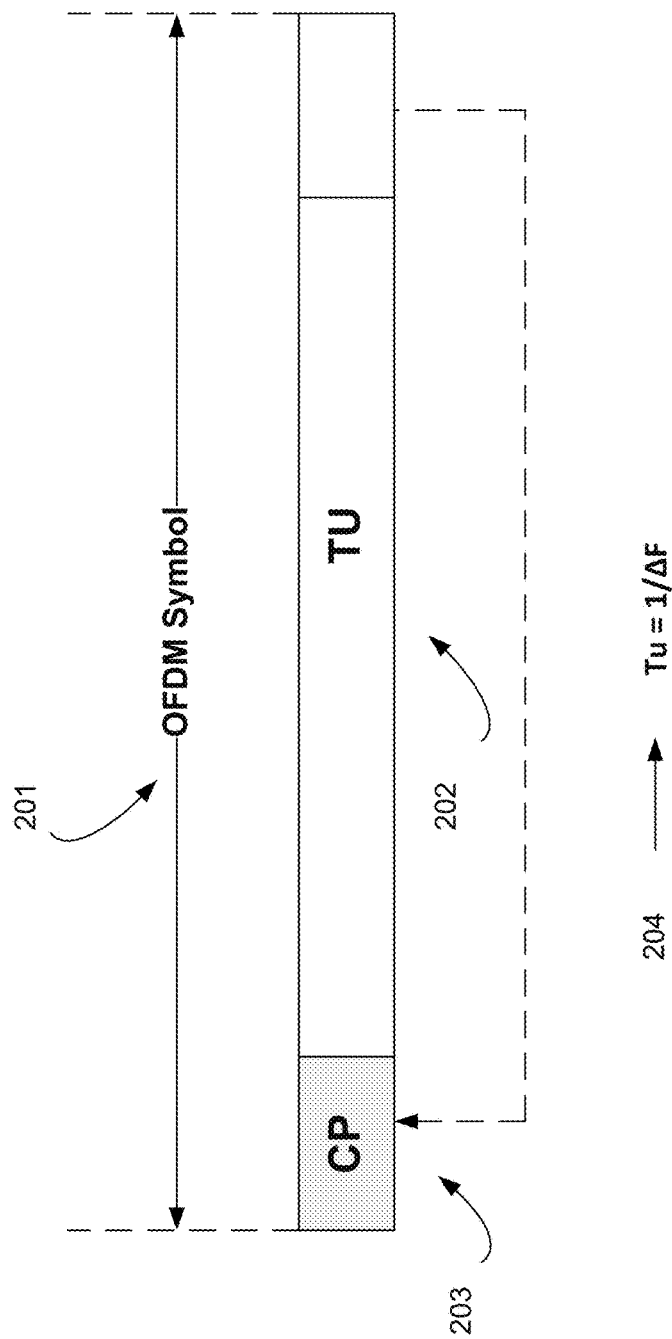
FIG. 2 illustrates an exemplary OFDM numerology in the time domain, according to some aspects/embodiments.

FIG. 2 shows the OFDM symbol numerology in time domain for cyclic prefix based OFDM, according to some aspects/embodiments. The OFDM symbol 201 in time domain is made up of Tu 202, the useful part of symbol, and Cyclic Prefix CP 203 used to mitigate delay spread. The equation 204 shows the length in time of Tu is inversely proportional to the value of the sub-carrier spacing ΔF (Hz). The larger the sub-carrier spacing ΔF becomes to meet requirements of higher frequency 5G bands, the smaller the symbol length Tu becomes. Since the CP 203 is derived from TU 202, smaller cell size is used for the high frequency bands of 5G unicast service.

Figure 3:
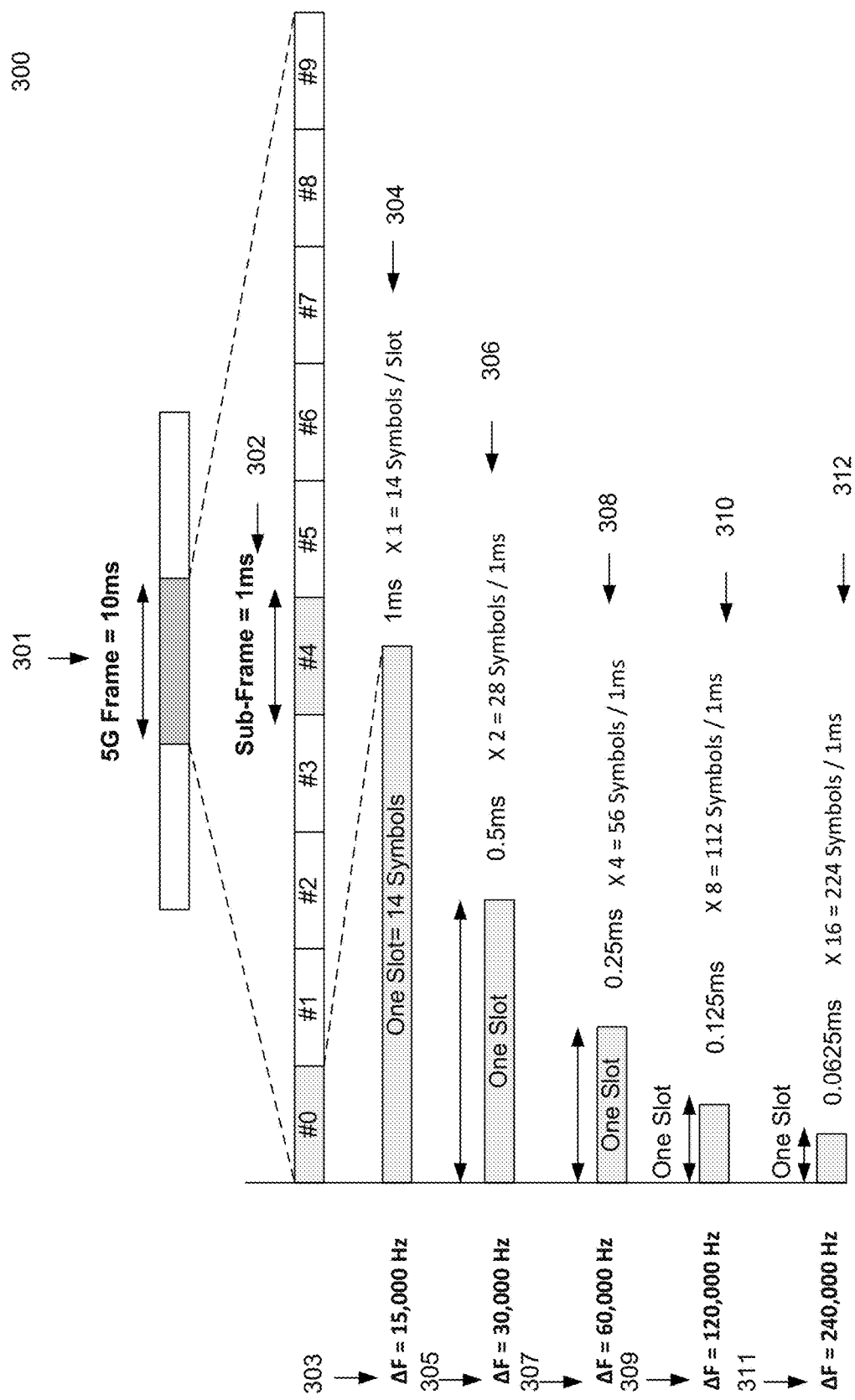
FIG. 3 illustrates an exemplary 5G OFDM Numerology Time Domain and Fixed Frame Size 10 ms, according to some aspects/embodiments.

FIG. 3 illustrates an exemplary 5G OFDM symbol numerology in the time domain for all bands up to 52 GHz in release 16 and the fixed 10 ms 5G frame size 301, according to some aspects/embodiments. A 5G frame can be composed of 10 sub-frames 302, each 1 ms in duration. Each sub-fame (e.g., slot) can be composed of 14 OFDM symbols in time domain. The smallest OFDM numerology 303 ΔF=15000 Hz is used in 4G LTE and the subframe length is 14 symbols 304, for example. For next higher frequency band, a larger sub-carrier spacing 305 ΔF=30000 Hz can be used and a sub-frame length can be 28 OFDM symbols. Then next higher frequency band 307 ΔF=60000 Hz can be used and a sub-frame length can be 56 OFDM symbols. Then next higher frequency band 309 ΔF=120000 Hz can be used and a sub-frame length can be 112 OFDM symbols. The highest frequency band 311 ΔF=240000 Hz can be used and a sub-frame length can be 224 OFDM symbols. As the result of the Tu equation 204, sampling frequency F(s) 104 is increased with a fixed IFFT size 4096 105 used in 5G, according to some aspects/embodiments.

Figure 4:
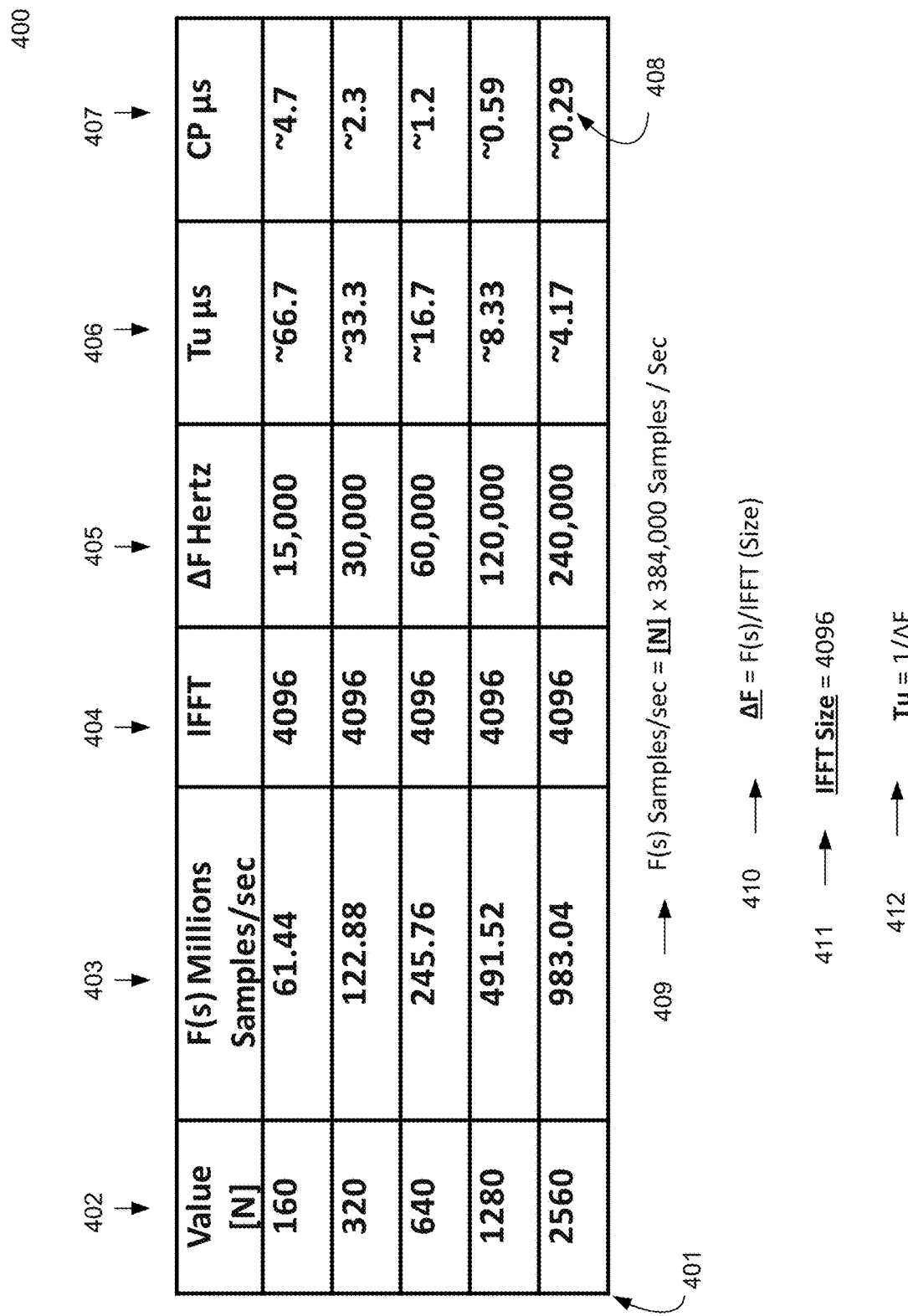
FIG. 4 illustrates an exemplary 3GPP 5G OFDM numerology in frequency and time domains, according to some aspects/embodiments.

FIG. 4 and table 401 illustrate exemplary values of 5G OFDM detail numerology in both the frequency and time domains as of release 16, according to some aspects/embodiments. The equations 409, 410, 411, 412 previously discussed are shown again for reference.

The value N is seen increasing in column 402. The sampling frequency F(s) equation 409 is shown increasing in column 403 as result of increases in N. The IFFT size 411 is fixed 4096 and shown in column 404. The results are larger sub-carrier spacing ΔF (Hz) as seen in column 405.

Column 406 is values for Tu 412 in the time domain. Column 407 is values of CP in the time domain. The values of Tu and CP get smaller with increasing values of the sub-carrier spacing ΔF (Hz).

The highest GHz frequency band in 5G (e.g., N=2560) has small cell size in time domain, which is determined by the value CP 408 that is 0.29 microseconds in length. In some examples, the CP length can be longer than the longest echo of the longest delay path between transmitter and receiver (UE). The radio waves travel at the speed of light~300,000,000 meters/sec. Then a radio wave travels 87 meters in 0.29 microseconds. The distance between cell towers is limited to be less than 87 meters. This is fine for dense unicast service in an urban center were each user can expect to request different data at the same time. However, cost of this small cell infrastructure installed over a large area 87 meters at a time can be costly to operator in 5G. In contrast, for use cases when common data needs to be sent to large number of users interested in the same social media and/or entertainment unicast is not a good choice based on both physics and economics.

It will be shown later that convergence of 5G and broadcast with a broadcast single frequency network topology with towers spaced 10-20 km has the correct physics and is much more economical for distribution of common data and entertainment to more users over a wider area. The economic savings will bring down the price and make such services available to more users quicker over a larger area. The decision to use unicast or broadcast can be based on traffic type and network demand. The decisions can be made by the converged networks for the benefit of the customers and operators. Broadcast has useful place in the 5G in future in use cases that it has the best physics and economic proposition.

Figure 5:
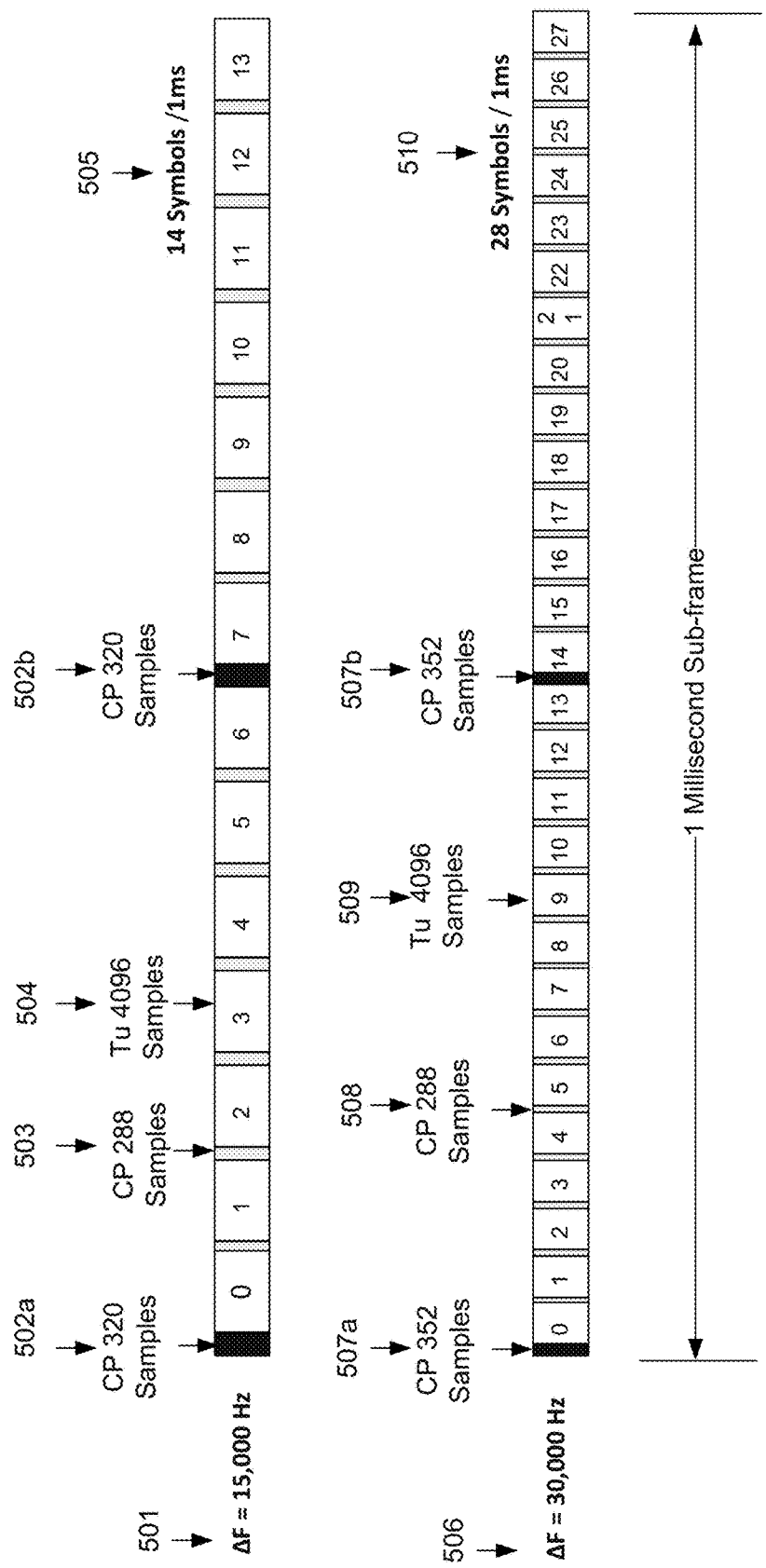
FIG. 5 illustrates exemplary 5G excess samples in time domain, according to some aspects/embodiments.

FIG. 5 illustrates an exemplary 5G OFDM numerology in time domain in more detail into the fixed frame size of 10 ms and how it is achieved, according to some aspects/embodiments. This has relevance for broadcast convergence, as discussed later. Each 10 ms 5G frame is made of 10 sub-frames each of 1 ms in duration. The sub-frame made of $\Delta F$=15000 Hz 501 has 14 OFDM symbols 505. Time is stated in number of samples periods 1/F(s). The Tu 504 has 4096 samples and CP 503 has 288 samples. The math of adding 14 symbols (Tu+CP) results in a value less than the 1 ms of the sub-frame. To resolve this deficit, the 5G standard adds additional samples to CP 502$a$, 502$b$ to become 320 samples. The length of sub-frame is then 1 ms in duration. Before looking at FIG. 6, which has more details on excess samples used, 5G can use another example as $\Delta F$=30000 Hz 506. The Tu 509 and CP 508 are the same as before but the number of excess samples in CP 507$a$, 507$b$ are 352 samples. When the 28 OFDM symbols 510 are added with these excess samples, the sub-frame length can be 1 ms.

FIG. 6 illustrates table 601 including the details on the number of excess samples used in 5G for each sampling frequency F(s) column 602, according to some aspects/embodiments. The column 602 shows number of samples used in 1 ms for a sub-frame. Column 603 shows the summation of all symbols and number of samples less (deficit) than the value in column 602. The deficit number of samples is shown in column 604 and this value is evenly divided over the two CP as shown FIG. 5 to achieve 1 ms duration sub-frames. The 10 sub-frames will then equal a 10 ms 5G frame.

Figure 7:
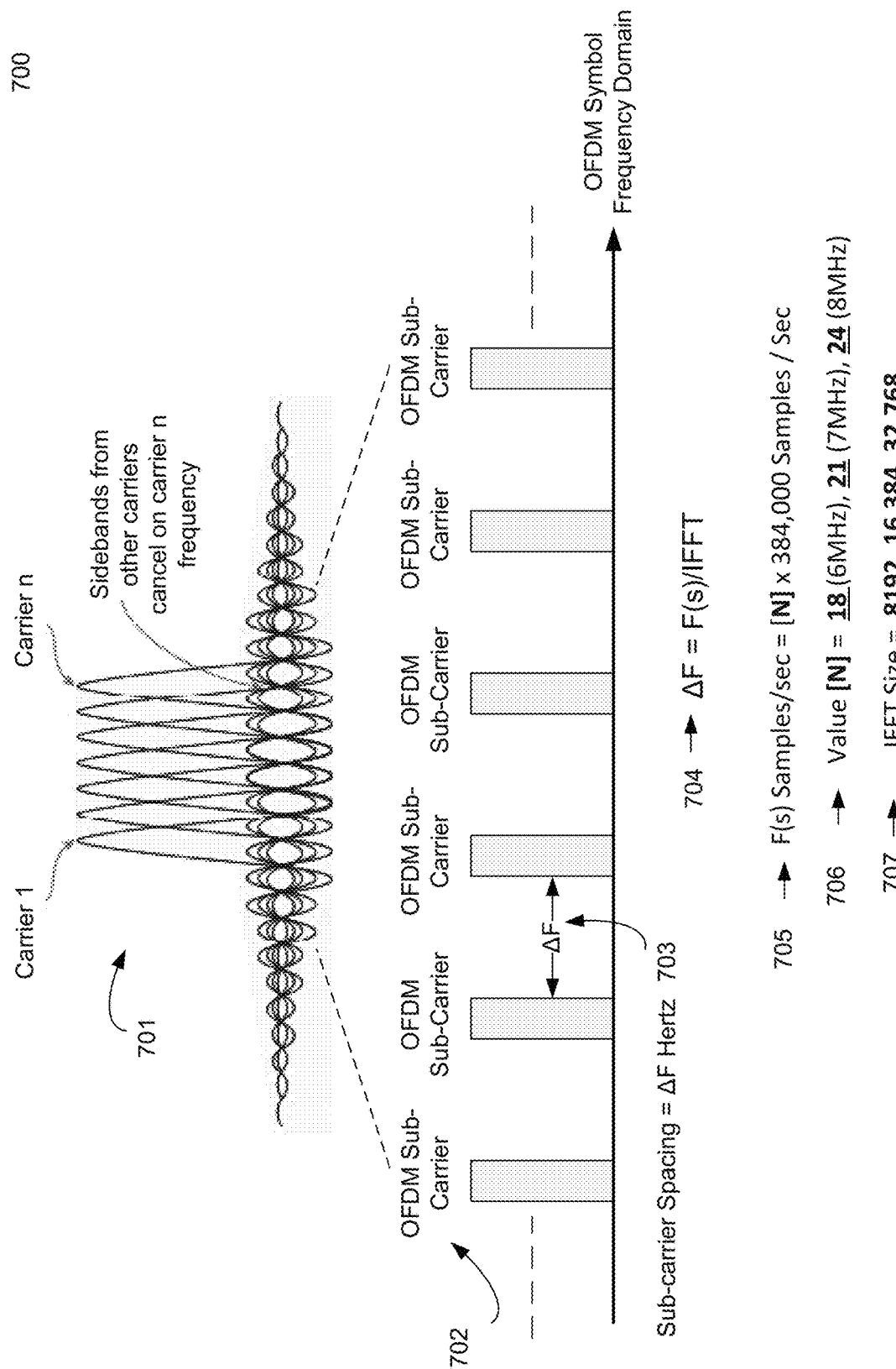
FIG. 7 illustrates an exemplary ATSC 3.0 OFDM numerology in frequency domain, according to some aspects/embodiments.

FIG. 7 shows the ATSC 3.0 OFDM numerology in the frequency domain as standardized by ATSC, according to some aspects/embodiments. The graph 701 depicts drawing of OFDM symbol and orthogonality determined by equation 704 to mathematically enable the sub-carrier spacing $\Delta F$ 703 to produce orthogonal sub-carriers 702.

The sampling frequency F(s) equation 705 has same base 384,000 samples per second and factor N as the 5G standard, according to some examples. The ATSC 3.0 (see, for example, U.S. Pat. No. 10,079,708 issued Sep. 18, 2018, incorporated herein by reference in its entirety) was designed to have common base 384,000 samples per second to be aligned with LTE and any evolution in standard 5G. The 384,000 samples are related to Wide Band Code Division Multiple Access (WCDMA) chip rate and was used in LTE release 8 for backward compatibility and maintained in 5G.

The difference in value of the sampling frequency F(s) between ATSC 3.0 and the 5G numerology is in the selection of the value of N. The ATSC 3.0 standardized three values of N 18, 21, 24 for three popular bandwidths used in television broadcast 6 MHz, 7 MHz and 8 MHz respectfully shown 706.

The ATSC 3.0 standard has three IFFT sizes shown in 707 as 8192, 16384, and 32768, respectively. Therefore, equation 704 has two variables F(s) and IFFT to determine the sub-carrier spacing $\Delta F$ for the services offered with ATSC 3.0—unlike 5G, which has a fixed IFFT size and the variable is F(s), as previously discussed.

The ATSC 3.0 OFDM numerology extensions to be discussed for mobile and 5G convergence use more range in selection of values of N and have two additional IFFT sizes for flexibility.

Figure 8:
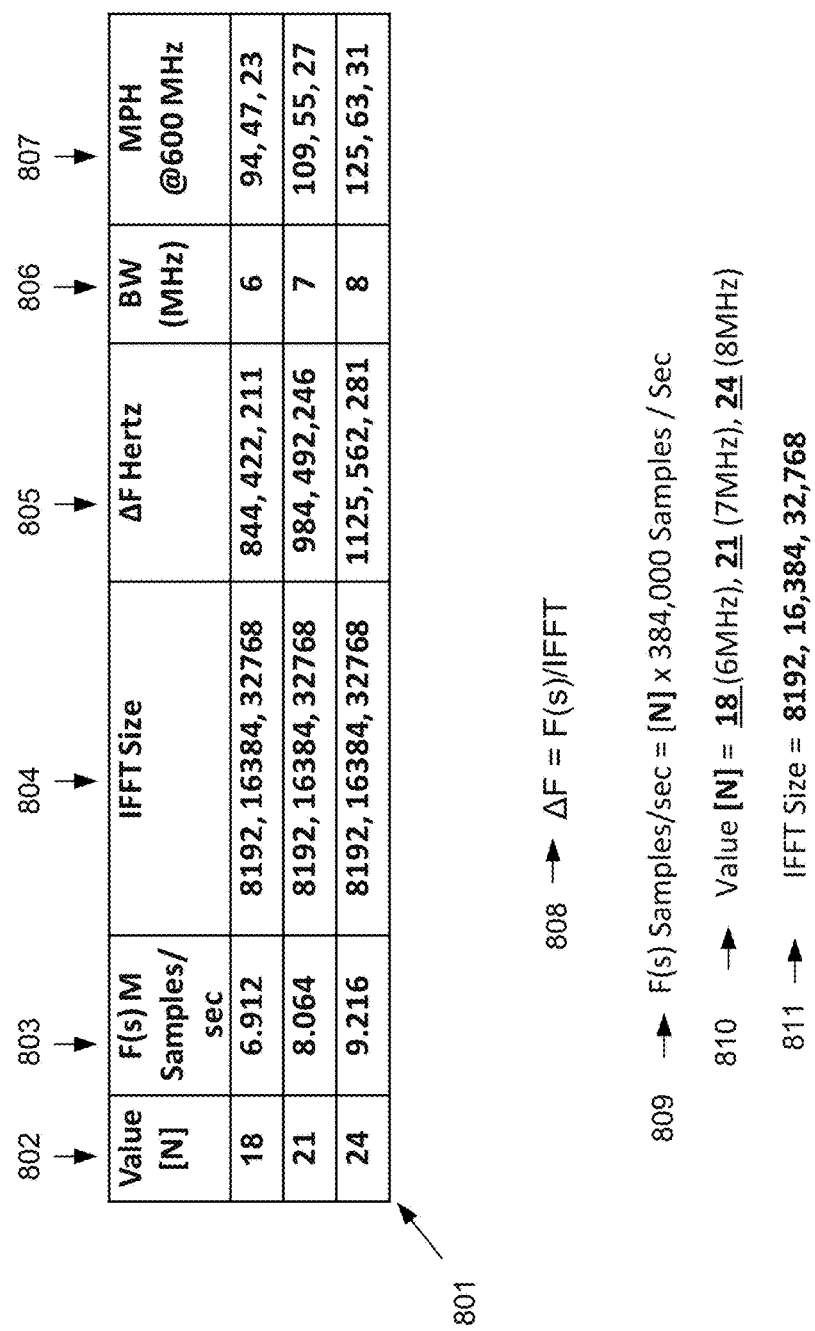
FIG. 8 illustrates an exemplary ATSC 3.0 OFDM numerology in time domain and Doppler MPH, according to some aspects/embodiments.

FIG. 8 illustrates exemplary ATSC 3.0 OFDM numerology in frequency domain and performance Doppler (speed MPH for mobile) as standardized by ATSC, according to some aspects/embodiments. The same equations 808, 809, 810, 811 from FIG. 7 are shown again for easy reference. The table 801 shows the values for N 802, F(s) 803, the IFFT sizes 804, $\Delta F$ 805, and the three Bandwidths 806 as standardized by ATSC.

The last column 807 shows that modest mobile performance MPH is achieved. In some examples, the ATSC 3.0 standard has been used for fixed television service and mobility was not a priority.

The extended ATSC 3.0 OFDM numerology to be discussed improves mobility for broadcast over wider bandwidths and aligns the broadcast OFDM frame structure and the 5G Frame structure to a common TAI network clock and enable convergence by orchestration in Broadcast and 5G Core networks.

In some examples, the Doppler performance condition for 5G can be 250 km/hour for mobile and high-speed train is 500 km/hour. By increase in selection range of N and two additional IFFT sizes will position broadcast for mobility and convergence with 5G.

Moreover, the emergence of a programmable SDR demodulator chip in an ATSC 3.0 receiver to be discussed will accommodate these extensions in OFDM numerology and make broadcast 5G convergence viable by 2020 when 3GPP 5G release 16 is completed.

Figure 9:
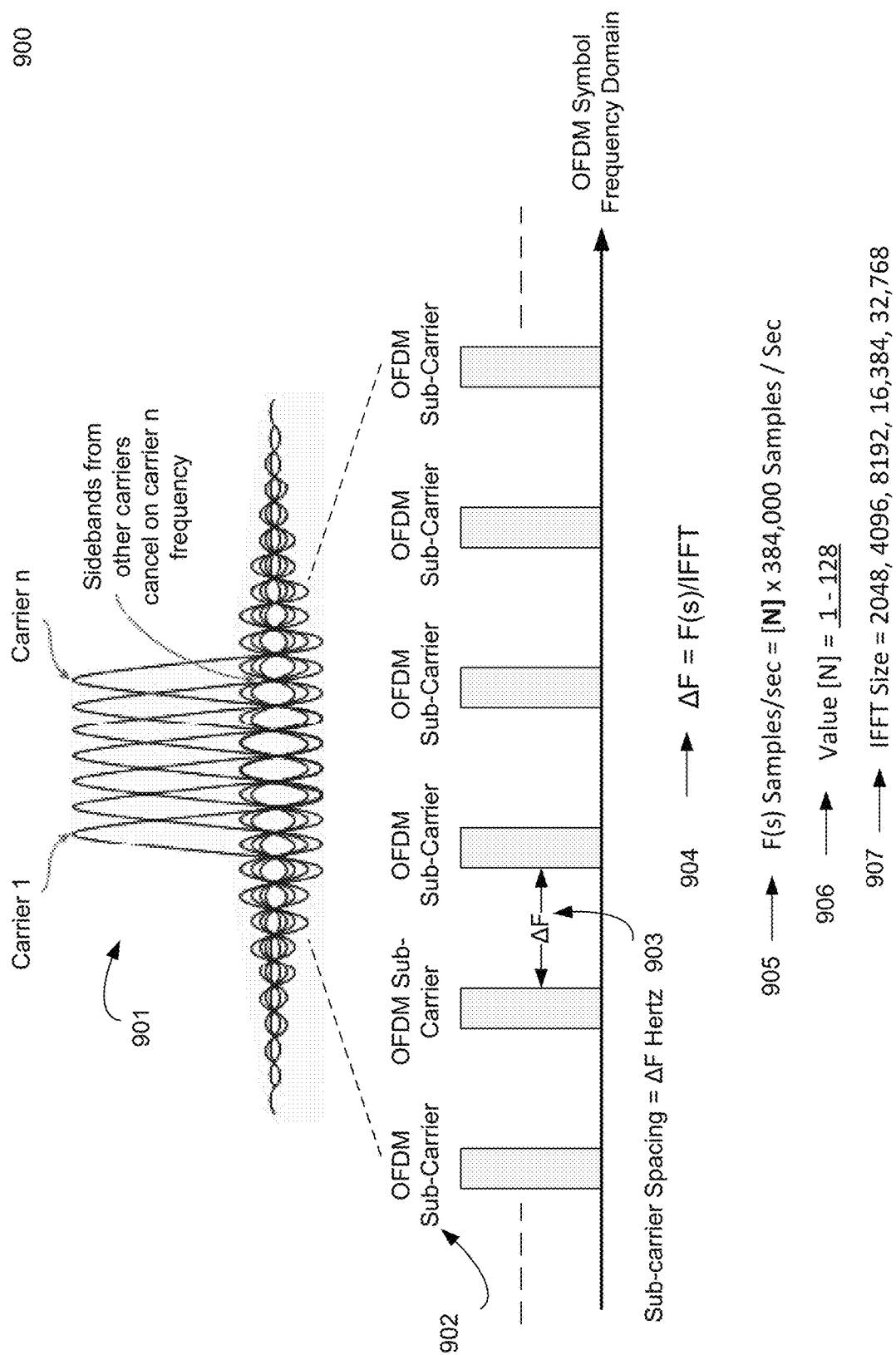
FIG. 9 illustrates an exemplary ATSC 3.0 extended OFDM numerology in frequency domain, according to some aspects/embodiments.

FIG. 9 illustrates the extensions to the ATSC 3.0 OFDM numerology in the frequency domain for mobility and convergence, according to some aspects/embodiments. The graph 901 shows the broadcast OFDM symbol in frequency domain and the sub-carrier spacing $\Delta F$ 903 and the desired orthogonality to be achieved by equation 904. The IFFT sizes 907 now include two additional values 2048, 4096.

The equation 904 is for calculating $\Delta F$ 903 as shown. The F(s) equation 905 is the same as 5G with base 384,000 samples per second and now has an extended range of values of N. The extended values N now range from 1-128 as shown in 906. The new range N is signaled by 7bits in the bootstrap for the receiver to discover quickly at lowest level, as to be discussed.

The extended broadcast OFDM numerology has two variables in equation 904 F(s) and IFFT for flexibility for mobility over broader bandwidths and frequency bands than standardized by ATSC for television. When combined with other extensions to be discussed, this will give physical layer new functionality to improve mobility and make convergence viable with 5G in the future.

Figure 10:
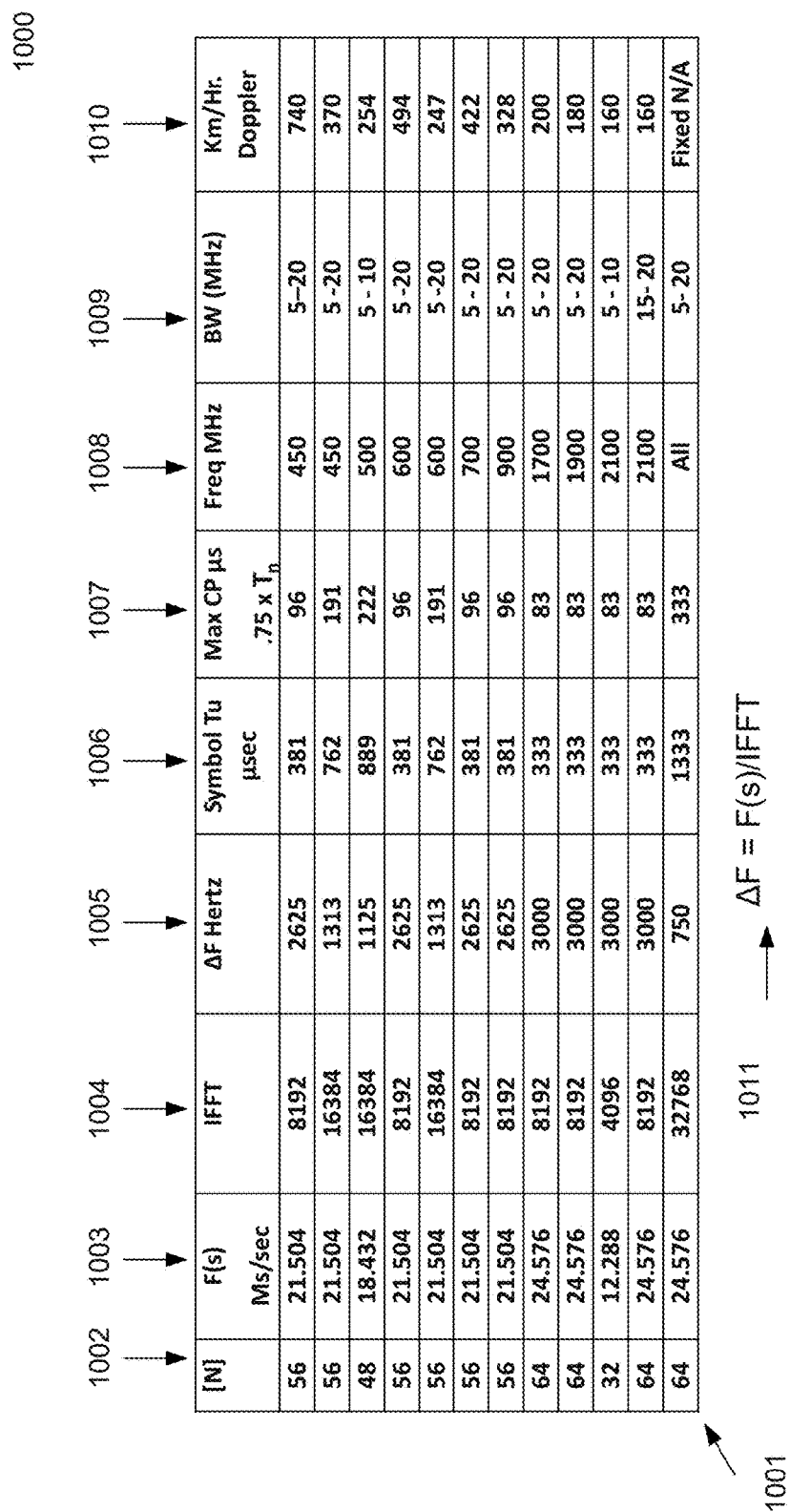
FIG. 10 illustrates an exemplary ATSC 3.0 extended OFDM numerology in time and frequency domains, according to some aspects/embodiments.

FIG. 10 depicts some examples of the extended broadcast OFDM numerology possible in frequency and time domains, according to some aspects/embodiments. Table 1001 shows some example calculations using equation 1011 to show some of this new flexibility. With N 1013 having values 1-128 and IFFT size 1014 having (5) selections in IFFT, table 1001 represents a sample of what is possible, and is meant to show flexibility, according to some aspects/embodiments.

Moreover, with a SDR on the broadcast receiver (UE) side the OFDM numerology parameters need not be decided upfront and then frozen in a standard as is traditional. But remain flexible to meet requirements and use cases that emerge in the future. This at a time when wireless network architectures in future will also be software defined SDN/NFV and programmable in both the broadcast and 5G networks. Software in future network architectures and UE side can bring flexibility for mobility and broadcast 5G convergence.

Column 1002 depicts some values of N 1013, according to some examples. The sampling frequency F(s) 1003 is calculated using equation 1012. Column 1004 is some selections of IFFT 1014. The sub-carrier spacing ΔF 1005 is calculated using equation 1011. There is one constraint in the current table 1001 examples that the sub-carrier spacing ΔF value is constrained to 3000 Hz the same as the A/321 OFDM bootstrap, which begins each frame. The bootstrap OFDM parameters are also scalable if higher frequency bands are used and AF can be extended. The OFDM parameters of A/321 bootstrap are retained for these examples and the bootstrap syntax and semantics is extended as will be discussed.

Column 1008 depicts some frequency bands and column 1009 depicts some extended bandwidths now supported. The last column 1010 depicts the extended mobility and Doppler performance (Km/hour).

One example is the values N 1002 can support a bandwidth of 50 MHz though this is not shown in limited examples of table 1001. The values in table 1001 are for examples and show some flexibility and those skilled in art will appreciate the flexibility and the bounds.

The extended broadcast OFDM numerology in time domain is shown in Tu 1006 and CP 1007. The values of CP in column 1007 show the maximum value CP given Tu and pilot density Dx=3 and coherence bandwidth equation Tn=Tu/Dx. The CP value 1007 is limited to 0.75×Tn, in some examples. Values of CP smaller than the values in column 1007 are possible. Only the Nyquist limit is shown in column 1007 as determined by coherence bandwidth.

The examples in table 1001 can be enabling and the final values will be determined when use cases become more known for broadcast 5G convergence. However, table 1001 shows that extending ATSC 3.0 OFDM numerology is possible. Also, the importance of the math relationship between broadcast sampling frequency F(s) 1012 to 5G sampling frequency F(s) 104 of FIG. 1 will enable time alignment between emitted frames and the signaling of this correlation to the converged dual connected UE will be discussed.

Figure 11:
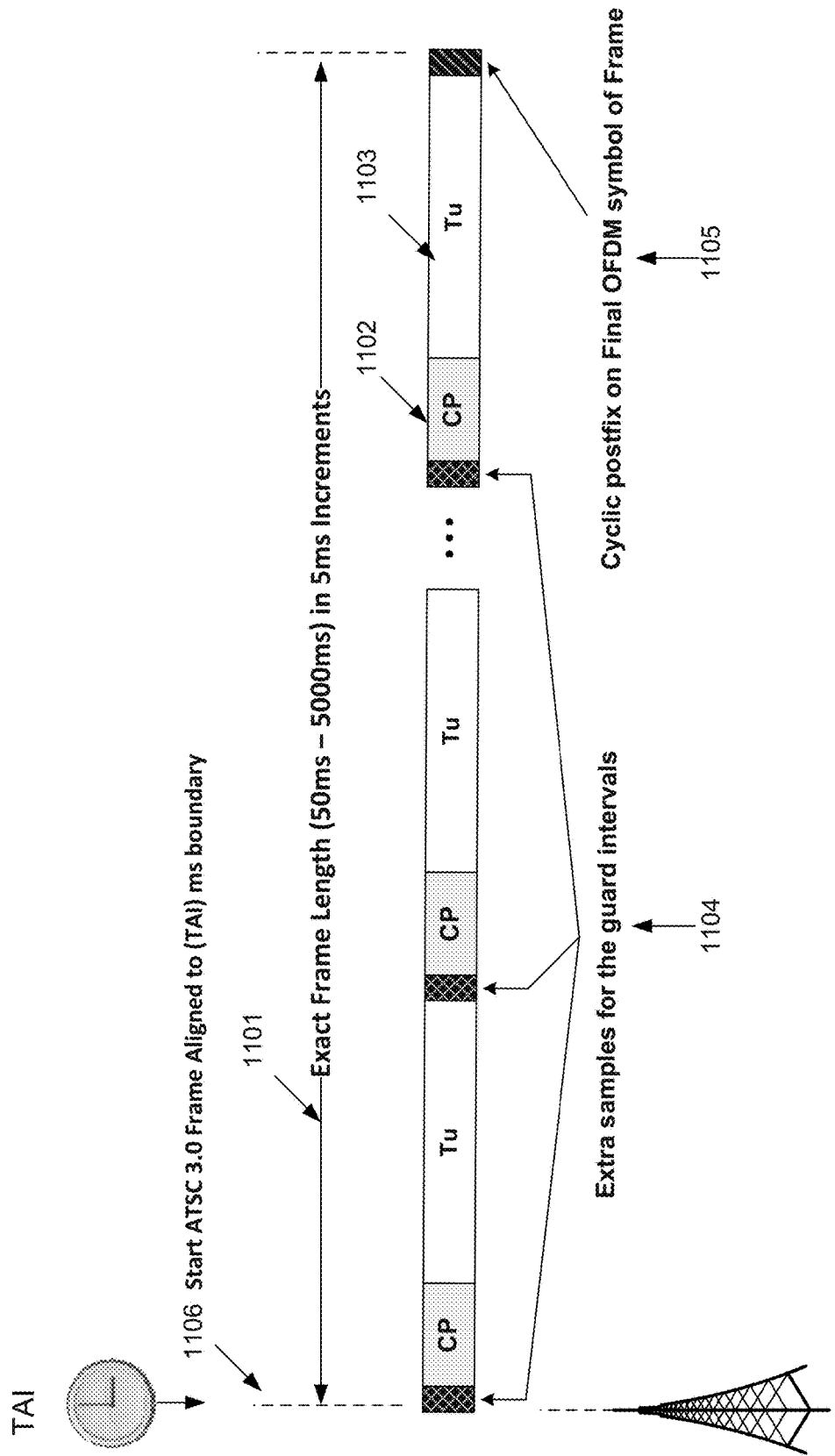
FIG. 11 illustrates exemplary ATSC 3.0 excess samples in time domain for frame alignment, according to some aspects/embodiments.

FIG. 11 shows methodology of using excess samples F(s) in time domain for broadcast frames sizes (50 ms-5000 ms) time aligned to millisecond boundaries of TAI network clock 1106, according to some aspects/embodiments. Frame 1101 is an example of a broadcast frame (50 ms-5000 ms) in 5 ms increments using excess samples.

The broadcast frame is composed of multiple OFDM symbols Tu 1103+CP 1102 depending on desired length of frame. Tu 1103+CP 1102 can provide number of symbols to achieve a frame (50 ms-5000 ms) in length. The probability that the summation of the OFDM symbols will equal the desired frame length is small and excess samples with be added to all CP 1102 of frame 1101 in an equal distribution, in some examples. Any remaining excess samples can be added to the last OFDM symbol 1105 as a cyclic post-fix.

This method will enable broadcast frame sizes and the start of a frame can be aligned to TAI clock 1106 in network. A frame begins with N bootstrap symbols followed by post-bootstrap symbols. In some examples, the excess symbols are added to post bootstrap symbols and the length of N bootstrap symbols is known and taken into the total frame length calculation of excess samples.

The value of having related F(s) will be seen. A 5G Frame size of N millisecond in length uses an integer number of samples/sec derived from TAI network clock. A broadcast frame of N millisecond length uses an integer number of samples/sec derived TAI network clock. In some aspects/ embodiments, when the start of each frame is calibrated to TAI at air interface of their respective antennas, this time relationship of frames once established will not drift. This stability supports signaling data placed in each frame for benefit of (UE) receiver in convergence, which will be discussed later.

Figure 12:
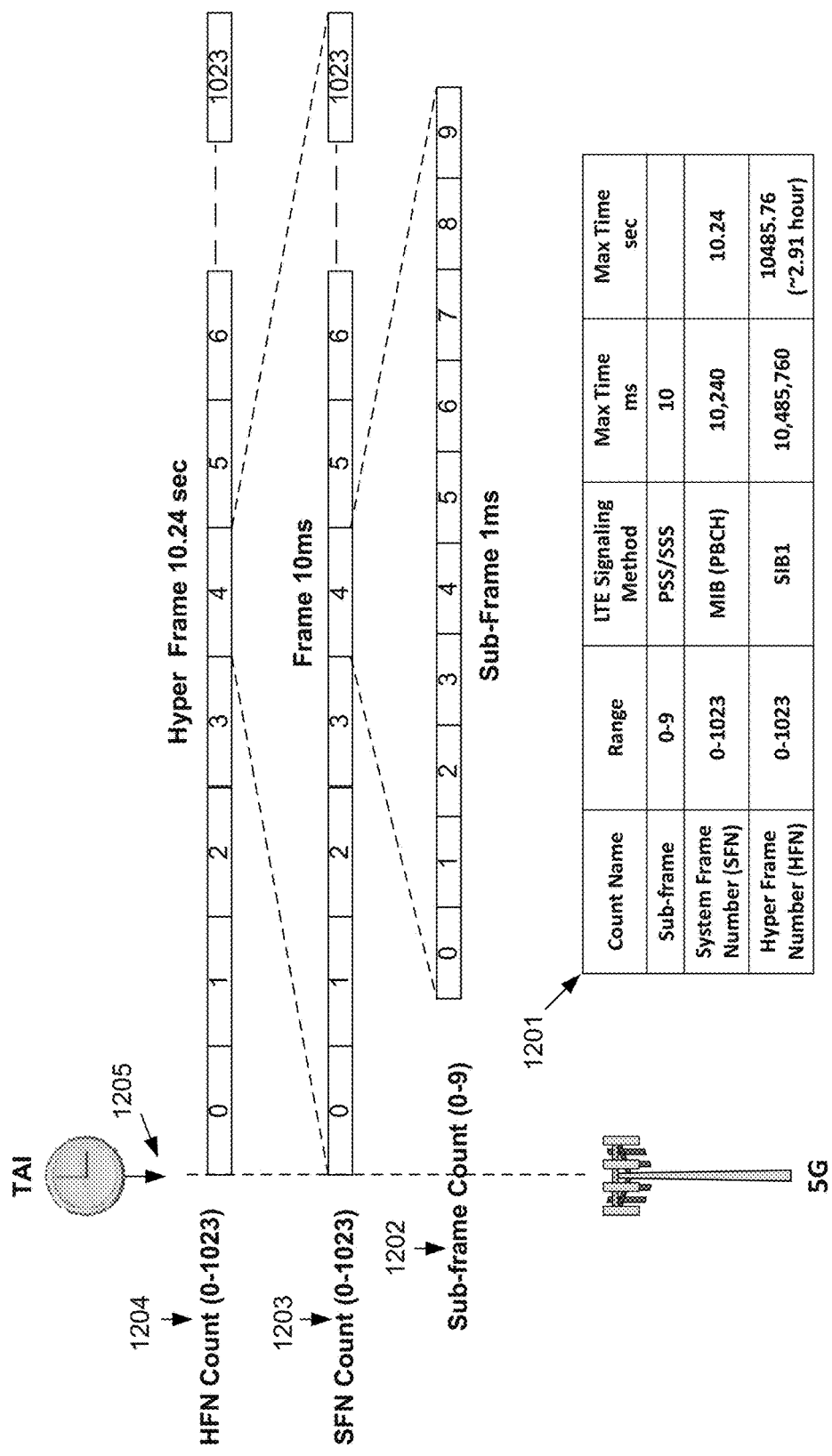
FIG. 12 illustrates exemplary 5G temporal frame counters signaled for various 5G use cases, according to some aspects/embodiments.

FIG. 12 shows the hierarchical counters used in 5G and signaled to the UE when attaching to the network for, for example, services, etc., according to some aspects/embodiments. According to some embodiments, in a communication system, one requirement can be that the transmitter and the receiver operate at the same tempo and operate in a synchronized mode. The hierarchical frame counters are mechanisms used in 5G for various purposes and use cases.

There are three hierarchical counters related to 5G frame cadence and that are signaled to the UE in 5G. Counter 1202 is the continuous sub-frame counter (0-9) in 1 ms increments as shown in table 1201 then resets to zero. There are 10 sub-frames in one 10 ms frame. Then System Frame Count (SFN) 1203 is a continuous counter that increments from (0-1023) for each 10 ms frame then resets to zero. Finally, a Hyper Frame Number (HFN) 1204 continuous count (0-1023) for every complete SFN count of 10,240 ms then resets to zero. The HFN count can be used for IoT use cases with UE that have infrequent access to network as it has a counter that rolls over~2.91 hours. These counters SFN/ HFN also allow UE and RAN to save battery power by UE because the counters SFN/HFN allow the UE to become active at times signaled by counter once synchronized to 5G frame cadence Table 1201 shows the counter name, range and signaling method and the maximum time (period) of each count. The SFN and HFN both have mod 1024 counts both phased starting from zero with HFN incrementing once for each SFN period 10,240 ms. The 5G frame cadence can also be locked or associated with the TAI clock 1205 ticks. TAI or GPS reference clocks are both based on atomic clocks and have the same phase of second (ticks) and are monotonically increasing (no leap seconds). The GPS epoch was 1980-01-06 at midnight UTC. According to some examples, the number of GPS seconds count, which is available via GPS receiver, is used for synchronization examples. The first sample of first symbol of 4G/5G 10ms frame and ATSC 3.0 extended frame 1307 is assumed to have begun at respective transmit antenna air interfaces at the GPS epoch, according to some embodiments. The Precision Time Protocol (PTP) is also based on TAI and can also be used knowing the PTP count is 00:00:19 ahead of GPS at epoch.

Figure 13A:
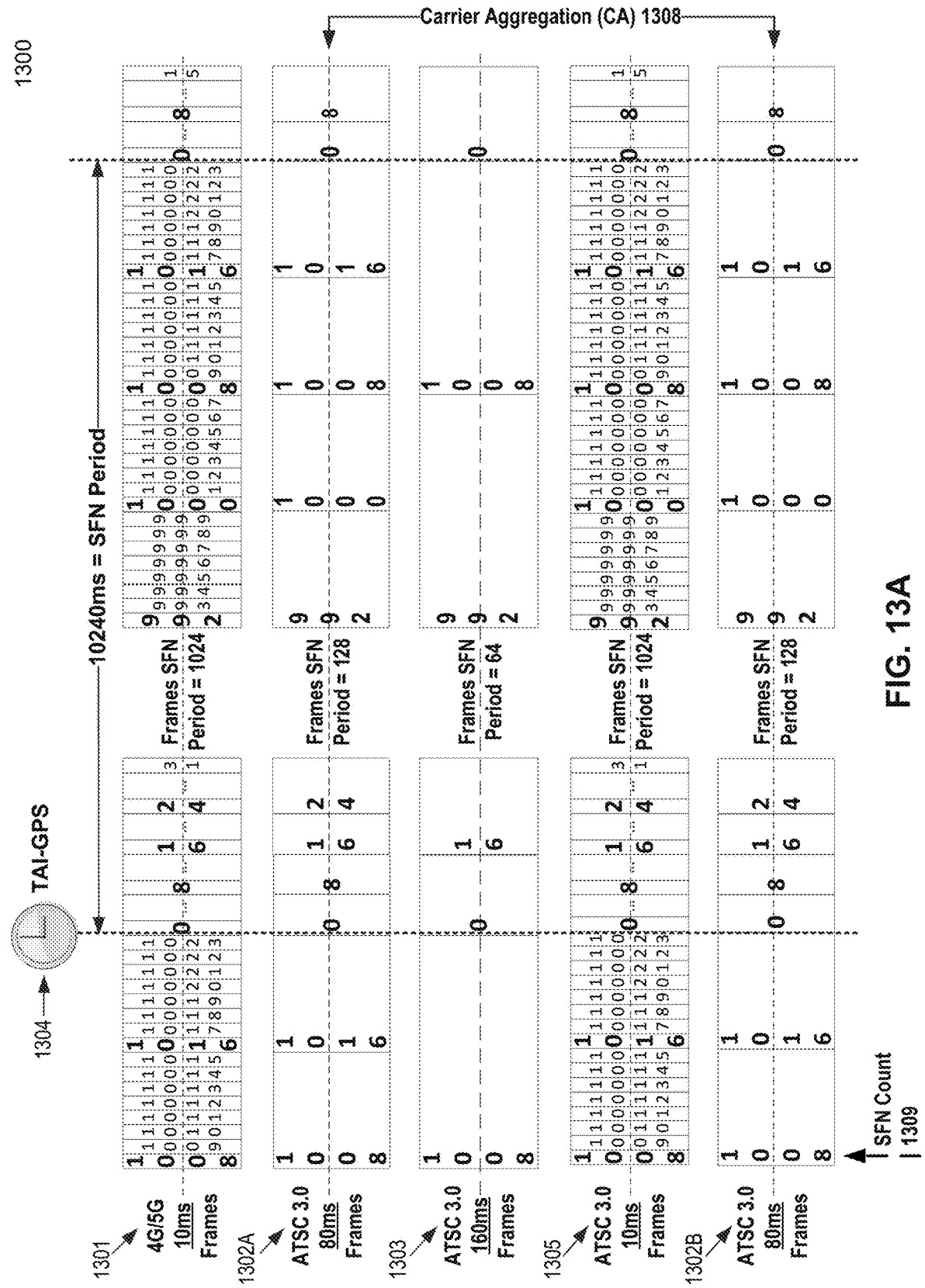
FIG. 13a illustrates an exemplary ATSC 3.0 extended frame structure, according to some aspects/embodiments.

FIG. 13a describes ATSC 3.0 extended frames' structure and FIG. 13b describes one example of ATSC 3.0 extended OFDM numerology used for calculating ATSC 3.0 frame lengths by equation 1306

$$\text{Frame Length ms} = \frac{1024}{2^N} \times 10 \text{ ms},$$

where N can be any value, for example, 2, 3, 4, 5, 6, 7, 8, 9, and/or 10, etc. The equation 1306 is used to select frame size that will have an integer number of ATSC 3.0 frames in an SFN period, which is 10,240 ms, according to some aspects/embodiments. For example, the SFN count uses a 10-bit counter mod 1024. Accordingly, there is 1024 increments×10 ms per frame resulting in a SFN period 10,240 ms. Table 1307 shows the ATSC 3.0 frame lengths based on value N equation 1306 resulting in an exact integer number of frames in 10,240 ms. By constraining the ATSC 3.0 frame size to less than 5000 ms, nine (9) possible frame sizes as shown in table 1307 can be generated.

As shown in 1300, there are 4G/5G frames 1301 of 10 ms duration, ATSC 3.0 frames 1302a and 1302b both of 80 ms duration, ATSC 3.0 frames 1303 of 160 ms duration and ATSC 3.0 frames 1305 of 10 ms duration as listed in table 1307. These frames are all locked to GPS 1304 and ATSC 3.0 frames share the GPS epoch and all have a constant integer number of frames per 10,240 ms SFN period so they can be synchronized and remain stable (not drift) when locked to GPS 1304. The 4G/5G and ATSC 3.0 10 ms frames have 1024 frames per SFN period, the 80 ms ATSC 3.0 frames have 128 frames per SFN period and the 160 ms ATSC 3.0 frames has 64 frames in an SFN period 10,240 ms.

In some aspects/embodiments, 5G NR 10 ms frame cadence can be established and maintained using SFN count mod 1024. A primary reference clock 1304 can be used based on TAI such a GPS. The definition of the GPS epoch 1980-01-06 at midnight UTC is used to define the instant the first 5G NR frame was emitted at transmit antenna air interface in network with SFN count equal to zero.

Therefore, the equation to determine the SFN count at any instant after epoch is: SFN Count=GPS seconds×100 mod 1024. The GPS seconds since epoch is available GPS receiver×100 converts seconds to 10 ms increments then mod 1024 will establish proper phase of SFN count at any instant since epoch. Also, PTP is based on TAI can also be used 1304 knowing the PTP count is 00:00:19 ahead of GPS at epoch.

Once synchronization is established the frames and SFN count mod 1024 phase will not drift being locked to a TAI reference clock. This frame synchronization when coordinated signaling is added in each frame can be enabling for a converged coordinated multi-RAT dual connected UE using methodology of 3GPP TR 23.793 (ATSSS) Access Traffic Steering, Switching and Splitting.

The current SFN period (count) at any instant in time can be derived using the GPS seconds count available from GPS receiver. When using equation: SFN Count=(Time GPS Seconds×100) mod 1024. The Time GPS Seconds×100 gives the number of 10 ms 4G/5G frames since the GPS Epoch and mod 1024 give the current SFN Count. The ATSC 3.0 frame length indicated by N equation 1306 and table 1307 can be flexibly change seamlessly on SFN period boundary when SFN count=0 as shown in drawing and still retain synchronization and in cadence this gives flexibility to change broadcast frame lengths. The common SFN+HFN count signaling 1309 is carried in all frames 4G/5G and broadcast ATSC 3.0 extended as shown to allow correlation and synchronization of content and services when upper layer signaling 4G/5G and ATSC 3.0 Extended is coordinated to support convergence. The SFN count is used in 4G/5G to identify a 10 ms frame in SFN period to UE. Some of the many SFN synchronization 4G/5G purposes are paging, DRX UE knows when to wake up for battery savings, IoT, etc. Also, the absolute SFN count in future is used as a pointer to future SFN event time by the upper layer protocols to synchronize RAN and UE. The HFN count 1309 is used for synchronizing future events with periods longer than 10,240 ms such as IoT, etc.

Locking of the physical layer frame cadences of the ATSC 3.0 Extended and 5G and coordinating SFN counts and upper layer signaling can bring great synergy for convergence. This can be achieved while using a dual connected UE. The dual connected UE can be connected to both 3GPP and Non-3GPP Access networks. For example, the Non-3GPP access network can be time aligned ATSC 3.0 extended and the 5G system according to the 3GPP TR 23.793 release 16 can be the 3GPP access network.

One example of convergence of 5G and ATSC 3.0 Extended broadcast network is at the dual connected UE, the dual connected UE can save battery power using SFN count to determine when to go to sleep and instant to wake up to receive ATSC 3.0 broadcast frames synchronized for download is one example. Also, using coordinated unicast 4G/5G frames for selective ARQ of dropped or errored broadcast packets is more efficient or economical when common large files or media is to be transmitted to a large number UEs with a dual connected converged UE.

Also, with the harmonized SFN Frame cadences 1300 the UE can easily receive PLP (content) in broadcast frames using converged coordinated signaling along with 5G unicast in the most efficient (economic) mix determined by the network analytics and or reception conditions reported at UE.

The converged IP content flows can be steered and or split traffic across ATSC3.0 extended broadcast and 4G/5G unicast frames and or switched seamlessly using intelligence core networks and signaling as described in 3GPP TR 23.793 when broadcast Non-3GPP aligns with 5G (convergence).

Using the MPEG Media Transport standards published by the International Organization for Standardization (ISO MMT standards) Mobile protocol above IP with the Hypothetical Receiver Buffer Models (HRBMs) in which timing is based on NTP is very synergistic for synchronization of converged media IP flows as shown in 2500.

This can easily support scalable video coding with the video base layer content carried and signaled on the ATSC 3.0 extend broadcast and enhancement video layer on unicast 4G/5G carried separately or the content switched seamlessly using TR 23.793 methodology for Non-3GPP access based on network analytics or receive conditions at UE.

The last ATSC 80 ms frame 1302b shown is on a different carrier frequency than 1302a and is using Carrier Aggregation (CA) 1308 with the time alignment shown. This CA is termed channel bonding in ATSC 3.0 and can increase channel data capacity (adding bandwidth) or the same content can be split on a symbol by symbol time multiplex across 1302a, 1302b to bring SNR improvement through increase frequency diversity which is useful in mobile fading channels.

Those skilled in the art should see the potential of additional use cases than the limited examples provided.

The longer frame lengths in broadcast 1307 is desired compared to the small constant 10 ms frames used in unicast. The increased length frames enable time and frequency diversity inside of these longer frame sizes to improve the performance and spectrum efficiency of broadcast in mobile environment. The frame length with longer symbols also enables transmitter diversity in the form of coherent signals from multiple synchronized transmitters and this is termed single frequency network (transmitter diversity) in which the adjacent transmitters signals add constructively improving the signal. As mentioned previously, according to some aspects of this disclosure, this optimization for physics of broadcast and increased diversity provides benefits in performance, spectrum efficiency and economic savings.

Figure 14:
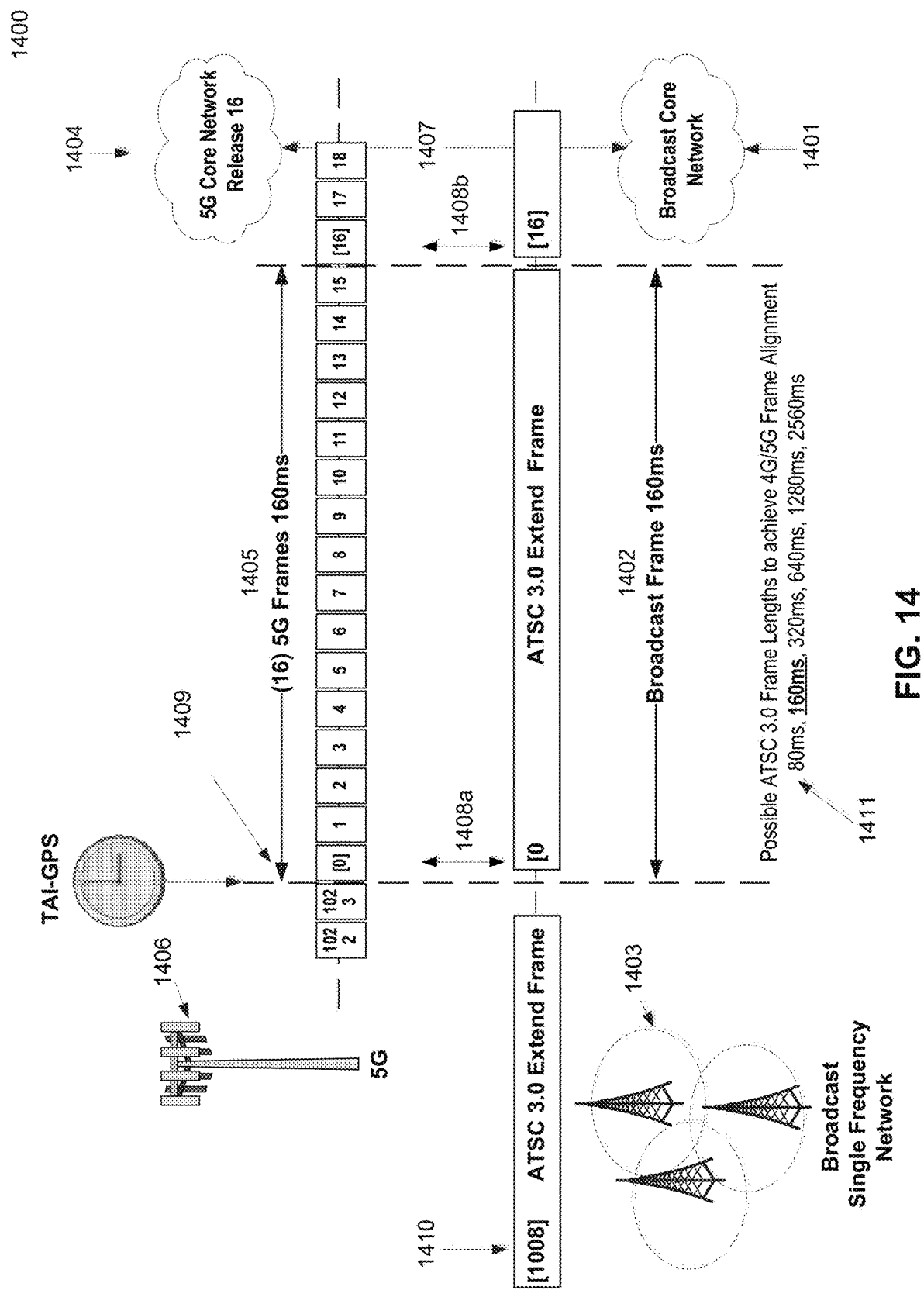
FIG. 14 illustrates exemplary 5G and ATSC 3.0 extended frames time aligned, according to some aspects/embodiments.

FIG. 14 shows one example of provisioning of Broadcast 5G Convergence, the temporal correlation of frames, according to some aspects/embodiments. The 10 ms 5G Frames 1405 is shown consisting of (16) 5G frames each 10 ms. These are correlated to TAI-GPS 1409 network clock at air interface on 5G antenna 1406. The 5G frames shown carry the signaling for system frame number (SFN) count as described in 1201.

The broadcast frame 1402 is 160 ms in duration from table 1307 as shown as one option 1411 and is correlated to TAI-GPS network clock 1409 at air interface on broadcast antennas 1403 of the broadcast single frequency network and the 5G 1405 and broadcast frames 1402 share common GPS epoch.

The system frame number (SFN) count is signaled 1410 in the L1 preamble 1307 of every broadcast frame. 1408*a*, 1408*b* shows the correlated counts of SFN in both the 5G frames 1405 and broadcast frames 1402 as they propagate from their respective antennas. The SFN count is (0-1023) is shown rolling-over reset to zero this is shown happening at instant 1408*a* to show synchronization of SFN cadence.

The sampling frequency F(s) of 5G 104 and Extend Broadcast 905 is designed with a mathematical relationship. Moreover, according to some embodiments, using a common globally available network TAI clock 1409 the temporal relationship and SFN counts once established will not drift over time (stable) and furthermore coordinated converged signaling is then inserted in all frames to support convergence.

According to some aspects/embodiments, an economic viable business model can be reached between a MNO 1404 with 5G Core Network release 16 and the broadcaster(s) 1401 with Broadcast Core Network, according to some examples. These IP Core networks have the intelligence and are interworking across a defined interface 1407 at the IP layer. As previously mentioned, the aspects/embodiments of this disclosure discuss the respective physical layers and 5G Core release 16 and Broadcast IP Core network.

The networks 1404 and 1401 are the core networks, having orchestration and physical layer OFDM resource schedulers (5G and Broadcast); responsible for scheduling data on the OFDM resources and building frames for 5G and extended ATSC 3.0 Broadcast. In cooperative convergence, the coordination of schedulers (context aware) of frame structure and signaling the SFN counts is as shown in example. The value of this deterministic temporal correlation of 5G and Broadcast frames will be shown next from perspective of the end to end converged network including the receiver (UE).

In a MNO method using 5G OFDM numerology table 401 and broadcast OFDM numerology table 1001 broadcast can be positioned as a trusted Non-3GPP access network as supported in release 16. In this trusted Non-3GPP access network method use case the orchestration would be in a single 5G core network 1404 integrating broadcast 1001 as an option in spectrum licensed by MNO are shared in the future release 16.

However, the extended broadcast OFDM numerology disclosed in table 1001 also supports bands outside of the broadcast band and these bands can be owned (licensed) by a MNO. Therefore, MNO could consider tightly integrating extended broadcast into its 5G Core network using trusted non-3GPP access and realize the benefits of broadcast 5G convergence. This is type of access method in 3GPP terminology used when a trusted Non-3GPP access network (broadcast) and is supported and tightly integrated in release 16. The various aspects of this disclosure provide many degrees of freedom a MNO would have using trusted non-3GPP access broadcast integration into his own 5G core network compared to un-trusted non-3GPP access and the two separate core networks 1401, 1404 shown interworking 1407 in 1400

Figure 15A:
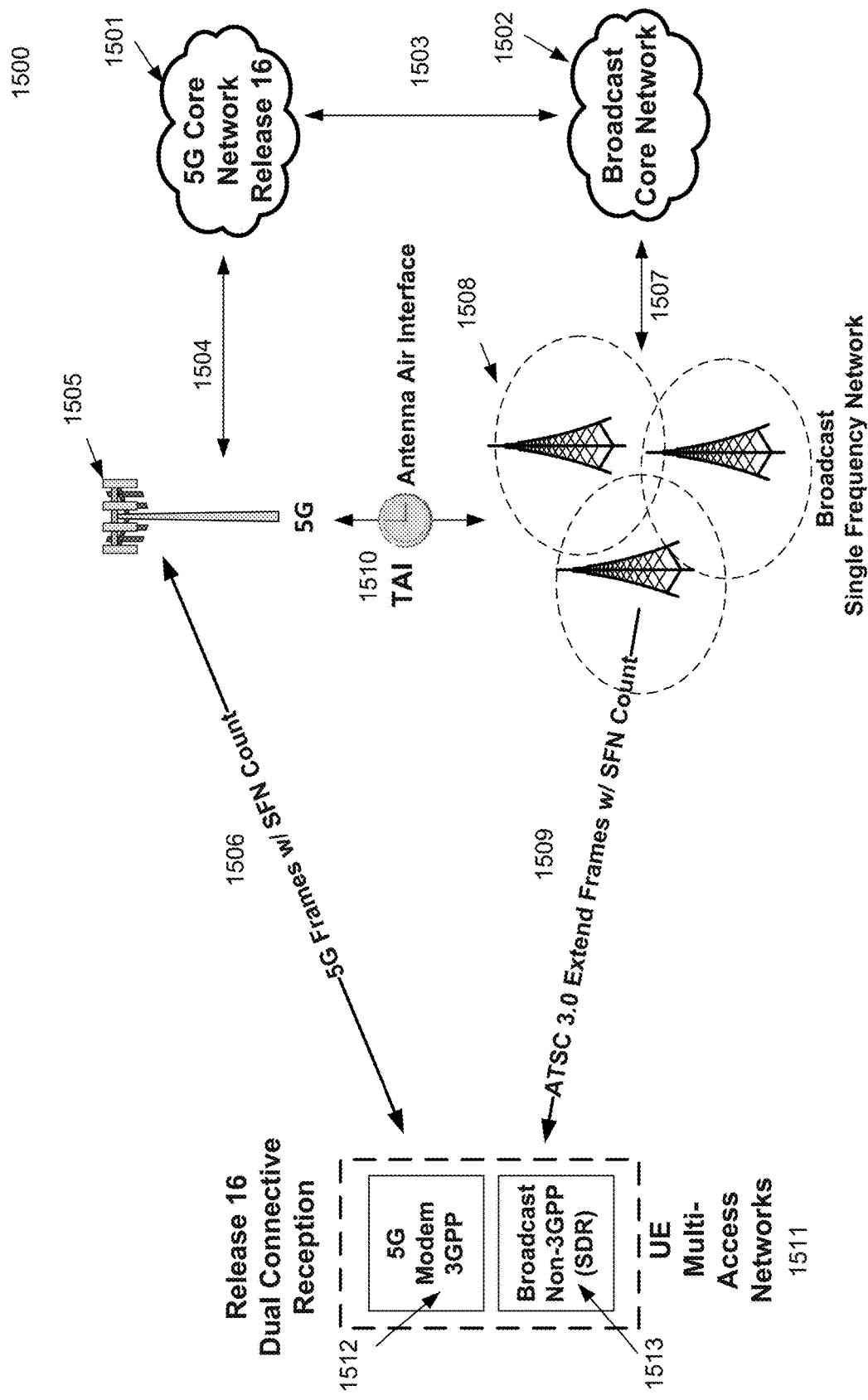
FIG. 15A illustrates exemplary convergence of 5G and ATSC 3.0 extended broadcast at a multi-access user equipment (UE), according to some aspects/embodiments.

FIG. 15A is an example of licensed broadcasters and interfaced with shared Broadcast Core Network and transmission infrastructure, cooperating in a converged network, according to some aspects/embodiments. The UE 1511 is shown with dual connectively simultaneous reception of more than one radio access network. The modem 1512 is a 5G Modem (3GPP) access network and the software defined radio (SDR) 1513 is an un-trusted (Non-3GPP) access network broadcast with flexible broadcast SDR demodulator chip.

The 5G core network 1501 and the Broadcast core networks 1502 are shown interworking 1503, as previously discussed. The physical layer schedulers in 5G network are sending baseband frames over 1504 to 5G Radio Head 1505, which converts baseband signal into analog RF signal and 5G frames aligned with respect to TIA network clock 1510.

The physical layer broadcast scheduler is sending broadcast baseband frames 1507 over to the broadcast exciters at single frequency network sites 1508. The broadcast exciters 1508 converts baseband signal into analog RF signal and the coherent broadcast frames 1508 are aligned with respect to TIA network clock 1510.

The 5G frames with SFN count 1506 are available to the dual connected receiver 1511, which recover and used to establish internal SFN counter. The broadcast frames with coordinated SFN count 1509 are available to the dual connected receiver 1511, which recover and used to establish internal SFN counter.

The broadcast 5G convergence happens both in core networks by schedulers interworking 1503 and at the UE 1511, which receives time aligned frames and synchronized SFN counts from both access networks 1506, 1509 operating on separate frequency bands. Like in 4G/5G, upper layer signaling can be associated with this temporal frame correlation and bind content or data on upper transport layers of these access networks using methodology such as 3GPP TR 23.793 such as steering, switching and splitting of content and/or data. This in a seamless manner by using time alignment and coordinated signaling. Additional synergistic upper layer transport time coordination is discussed in 2500 with MMT HRBM defined buffer models. This enables convergence that can abstract the access networks from the dual connected UE 1511 and is an example of an innovative converged heterogeneous network.

Moreover, the same related content or data could be sent over both access networks with this deterministic timing relationship. Which access network 1506, 1509 is used for delivery at an instant can be decided by the intelligence (policy, analytics, service level agreement (SLA) running in cooperating converged networks and or conditions at the UE as in 3GPP TR 23.793. This broadcast is now aligned as a non-3GPP access network.

One example of a use case is popular entertainment with scalable A/V coding with the base layer coding being sent over broadcast 1509 and the enhancement layer coding being sent over 5G 1506. When the dual connected UE 1511 reception conditions are good, both layers are received for enhanced reception quality. According to some aspects/embodiments, when the UE 1511 moves into an area that has poor 5G coverage where the benefits of broadcast on a lower frequency band with improved signal penetration into buildings, the reception would continue on the broadcast base layer coding via 1509 until 5G access 1506 is available using dual connected UE and no user action is required for a seamless experience with this synergy.

This could enable more wide area service for the user and cost effective for operators. This can be used for sports or other popular entertainment over wide areas on mobile devices including in moving vehicles, public transit, etc. with benefit of mixed converged unicast.

Also, wide area distribution of data (software updates) or when the government needs to alert and send important information to the pubic during an emergency or afterwards during disaster recovery, broadcast has the physics and the economics and the reliability and can be used when converged on dual connected UE 1511.

According to some examples, service requirements can be fulfilled by the physics and economics of unicast. When broadcast physics and economics are a benefit, broadcast is used in a converged intelligent network. Broadcast and unicast are diverse in many ways and are complementary technologies when driven by physics and economics under convergence.

The aspects and embodiments of this disclosure make possible the interworking and convergence of broadcast and 5G and bring many new degrees of freedom to explore new use cases with the physical layer extensions, frame alignment, and converged signaling.

Figure 15B:
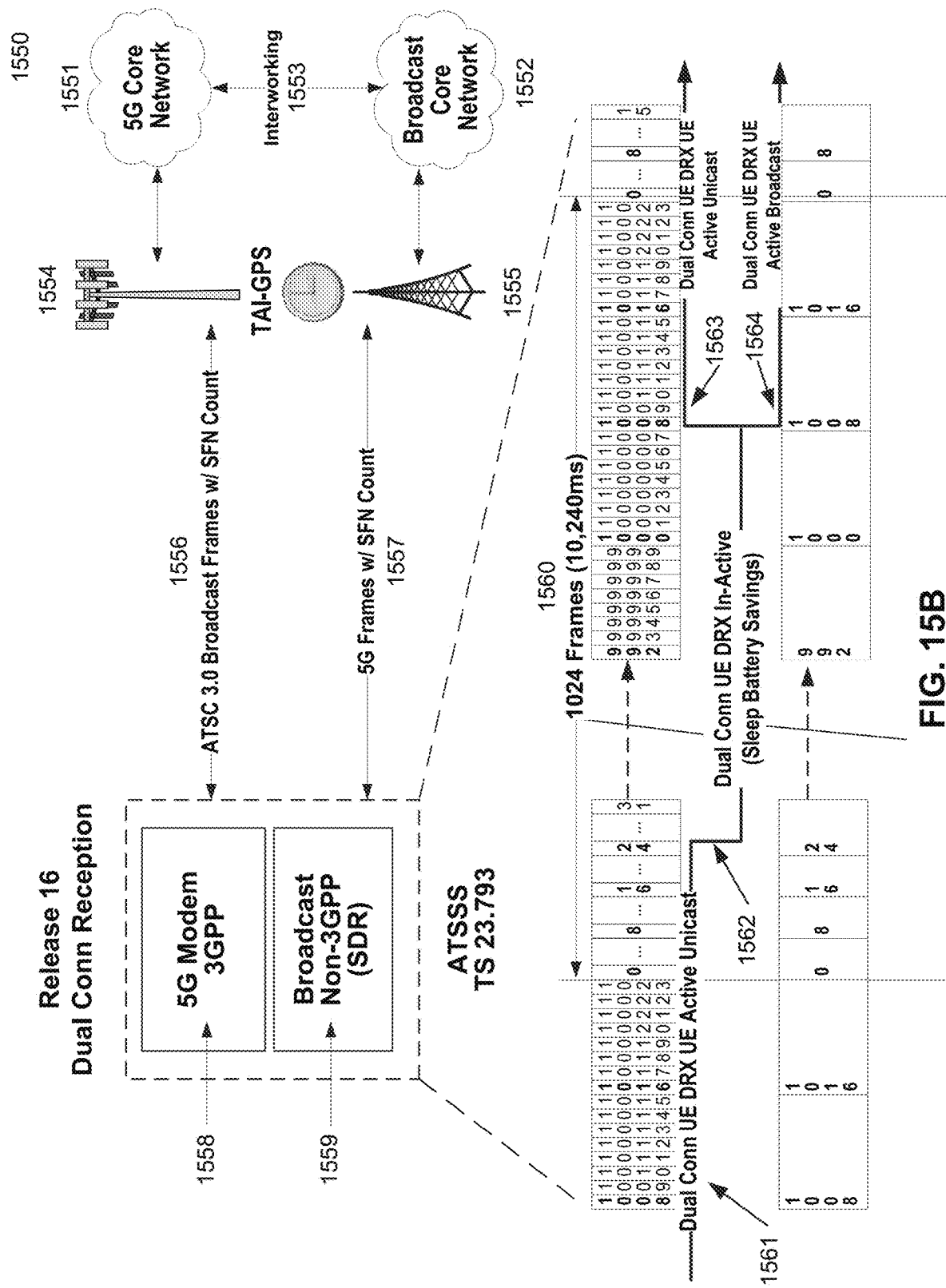
FIG. 15B illustrates exemplary content delivery, service timing and signaling synchronization for operators using broadcast 5G convergence, according to some aspects/embodiments.

FIG. 15B illustrates exemplary content delivery, service timing and signaling synchronization for operators using broadcast 5G convergence, according to some aspects/embodiments. System 1550 of FIG. 15B shows a potential use case of content delivery, service timing and signaling synchronized to improve the performance and efficiency (economics) for operators using broadcast 5G convergence and dual connected UE, according to some embodiments.

The 5G Core network 1551 and Broadcast Core network 1552 are interworking 1553 under convergence. The 5G RAN 1554 and the Broadcast RAN 1555 are emitting 5G frames 1556, and Broadcast frames 1557 that are time aligned GPS epoch and carrying a common System Frame Number and signaling for convergence from converged coordinated core networks 1551, 1552.

The dual connected UE has a 5G Modem 1558 and an ATSC 3.0 extended software defined radio (SDR) demodulator 1559 as the non-3GPP access network. The bottom of system 1550 in FIG. 15B illustrates a timeline of the received 5G frames and broadcast frames over an SFN period 1560 with coordinated signaling.

Each 5G frame with System Frame Count (SFN) 1556 and ATSC 3.0 Broadcast frame with SFN 1557 are received and used to establish and synchronize a local SFN counter established at the UE. The SFN counts are identical and based on GPS epoch. In one example, driven by coordinated signaling at instant 1561 the UE is active and receiving 5G unicast service only via a disconnected reception mode DRX as defined in 5G to save UE battery. At time SFN=0008 the dual connected UE goes into a low power sleep mode (saving battery) is in-active 1562. The UE has been instructed via coordinated signaling from core networks to sleep until SFN=1008 which is 10 seconds into the future and awake to become active at SFN=1008. At this instance both the 5G unicast 1563, and broadcast 1564 are active. The broadcast 1564 has the content or large file that must be distributed to many UE in the network.

The synergy is the power of broadcast 1564 (one to many) to send commonly needed content and or files instantaneously to a large population of UEs efficiently. This is instead of using many 5G point to point unicast connections one for each UE, which is inefficient for common content or files and can congest 5G network. The 5G unicast 1563 at SFN=1008 is shown active and is used to acknowledge the content was received or when the file download was completed successfully using broadcast 1564. The 5G unicast 1563 can also ask for selective retransmission of lost packets or packets received with errors from the broadcast. This is one example of traffic splitting 1563, 1564 as in TS 23.793 for dual connected UE with Access Traffic Steering, Switching Splitting ATSSS using core networks 1551, 1552. According to some examples, the timeline would be extended until broadcast of the content is completed. Then each UE will complete any dropped or error packets and acknowledge reception using unicast. The core networks have the policy and charging for SLA business models.

Figure 16:
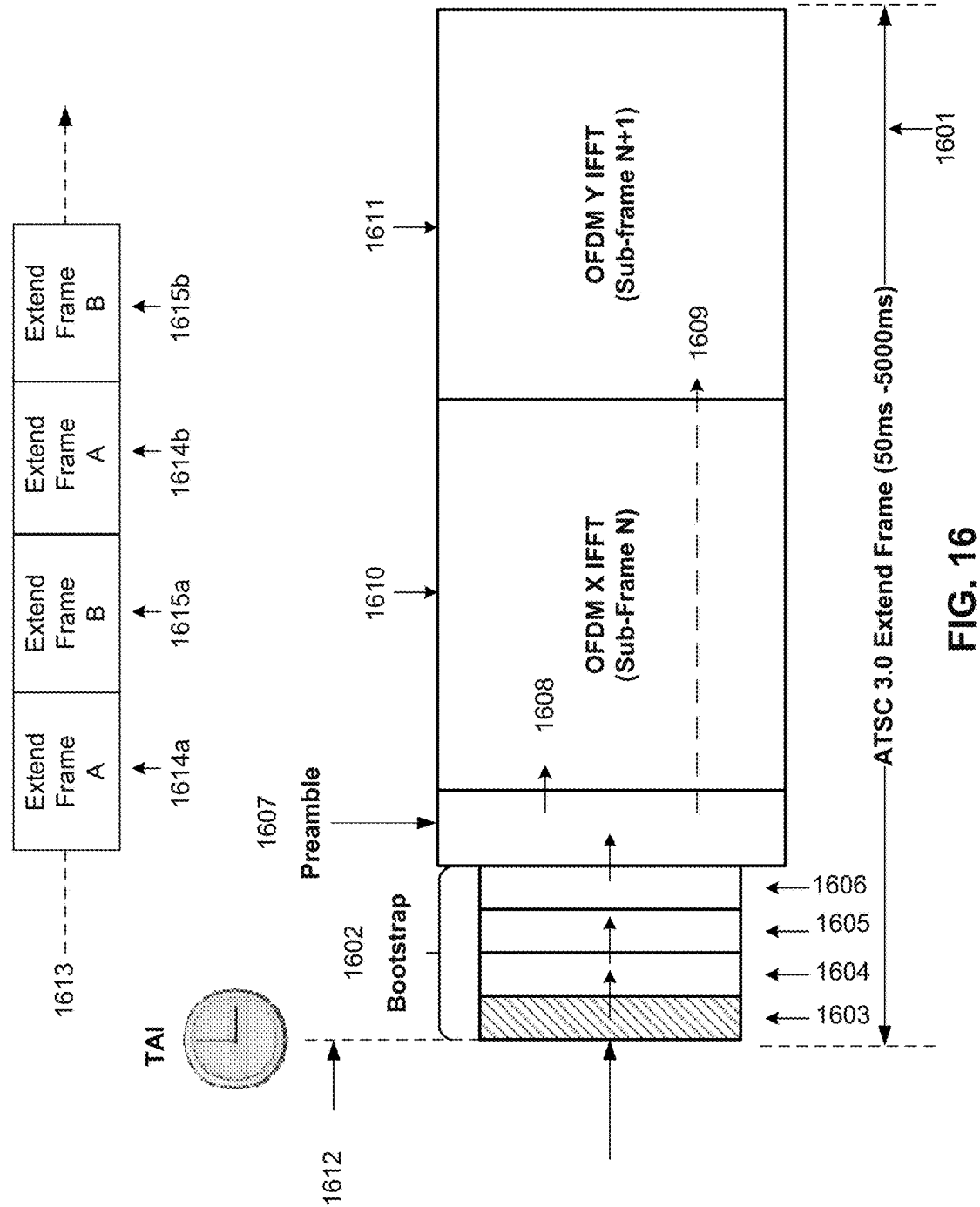
FIG. 16 illustrates an exemplary ATSC 3.0 extended frame with mixed OFDM numerology, according to some aspects/embodiments.

FIG. 16 is an exemplary ATSC 3.0 extended bootstrap and frame with mixed OFDM numerology, according to some aspects/embodiments. The ATSC 3.0 extended frame 1601 can be made of two sub-frames 1610, 1611 with different OFDM numerology supporting different use cases.

The number of sub-frames per frame is not limited and this flexibility is desired for the future. The extended bootstrap 1602 is composed of (N) symbols depending on amount of signaling used by use case. The example shows four bootstrap symbols 1602, but the embodiments of this disclosure are not limited to this example. The first symbol 1603 is used for synchronization and waveform discovery (Root+Seed) for correlation at receiver it has no additional signaling, but reception starts with the first symbol 1603.

The symbols 1604, 1605, and 1606 contain low level signaling to support the acquisition of L1 preamble 1607. The L1 preamble 1607 contains the signaling used to locate and decode the content or data in sub-frame 1610 shown as 1608 in the sub-frame 1611 as shown in 1609.

The sub-frames 1610, 1611 can be of different lengths or durations as can the length of overall frame 1601 according to table 1307. The beginning instant of frame 1601 is correlated to the TAI network clock 1612.

The extended bootstrap can support many different frame types (Root+Seed) shown as 1614a, 1614b and 1615a, 1615b that are time multiplexed and broadcast. The extended bootstrap syntax and semantics ensure extensibility a receiver receives a frame type (waveform) that it can support and ignore all others.

This flexible waveform capability is even more powerful if the receiver is an SDR 1513 and can dynamically adapt to changes in waveform for new use cases. This can enable market driven innovation and competition in a timely manner to be relevant in respond to real market forces in the future with networks and receivers UE defined by software.

Figure 17:
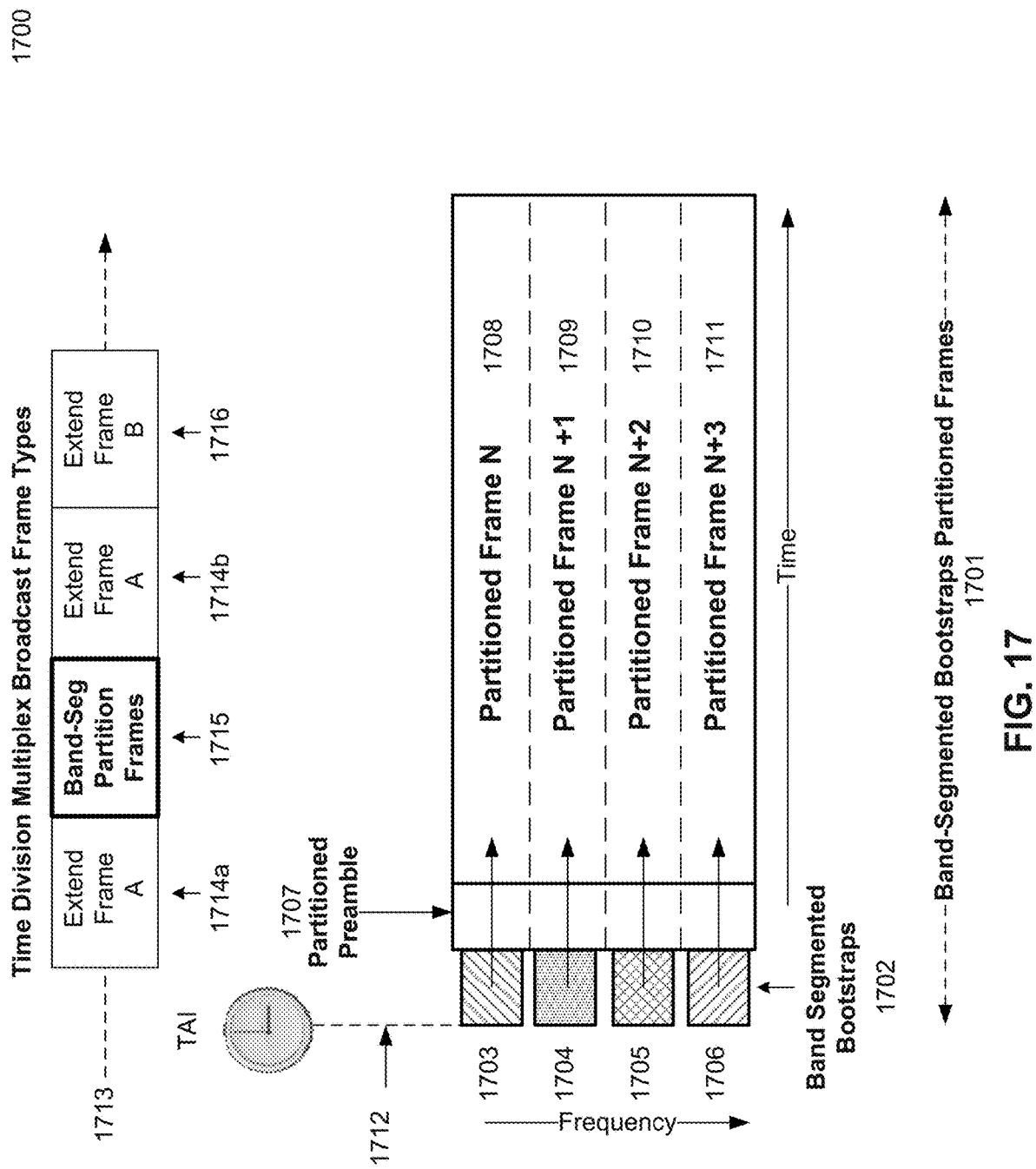
FIG. 17 illustrates exemplary band segmented bootstraps portioned frames, according to some aspects/embodiments.

FIG. 17 depicts a new construct where the bootstrap is segmented 1702 into multiple discrete narrow band bootstraps 1703, 1704, 1705, 1706 segments in the frequency domain each covering a portion of the total bandwidth, according to some aspects/embodiments. This is disclosed in U.S. Pat. No. 10,432,384, which is incorporated herein by reference in its entirety for all purposes. This construct can be useful for devices that use a waveform over a narrower bandwidth that saves battery, such as, but not limited to, IoT or other use cases with longer life battery requirements.

The L1 preamble 1707 is partitioned in frequency domain as are the frames 1708, 1709, 1710, 1711 and they share a common OFDM numerology IFFT size. The band segmented bootstraps 1703, 1704, 1705, and 1706 are separate and smaller bandwidth. Each bootstrap is centered in the respective partitioned L1 preamble and frame bandwidth.

According to some aspects/embodiments, the L1 partitioned preamble 1707 and frames 1708-1711 for example share a common 8192 IFFT size. There is efficiency in this partitioning in that there is no space or guard band between adjacent partitions. The UE for example receives bootstrap 1703 (Root+Seed) and synchronizes to center of the partitioned frame bandwidth 1708.

Then, having acquired the bootstrap 1703 signaling, the UE acquires the respective L1 preamble partition 1703. The UE is then able to demodulate the L1 preamble and associated frame partition 1708 using a 2048 FFT. This reduced signal processing possible on the shared 8192 IFFT saves battery power UE and is an efficient narrow band reception technique for use cases such as Internet-of-Things (IoT), etc.

The segmented bootstraps 1703-1706 could each have a unique (Root+Seed) combination and be targeted to a device type or use case, etc. The UE device knows the (Root+Seed) combination and acquires the service in the partitioned frame. The syntax and semantics of each partitioned bootstrap would be specific to waveform and use case. Though N separate bootstraps are possible, in this example four separate use cases could simultaneously share the same bandwidth using this bootstrap segmentation and frame partitioning scheme.

The frame 1701 is of a selected length according to table 1307 and is then aligned with the TAI network clock 1712. To illustrate the flexibility of the universal bootstrap 1713 shows that a time multiplex of different frame types is possible to broadcast. Including the band segmented partitioned frame 1715 and extended frame type 1714a, 1714b and frame type 1716 each with possible different OFDM numerology for specific use cases such as in 1601. This flexibility opens many new use cases. This synergy is again increased even more with dynamic nature of the SDR (UE) 1513 to adapt to new broadcast waveform types.

Another enabling technology in 5G is antenna beam forming steering of the RF energy in a certain direction on the transmit and the UE side adaptively. The higher frequency bands (up to 100 GHz) support beamforming steering to increase gain to mitigate propagation losses and shadowing at higher frequency bands and interference for more efficient use of spectrum, etc.

The 5G OFDM numerology includes synchronization signal blocks SSB placed throughout frame consisting of a primary synchronization signal (PSS) and a secondary synchronization signal (SSS) and low level signaling in the primary broadcast channel (PBCH) all forming an SSB. The UE uses SSB to initially access 5G network and quickly become synchronized and receive desired low level signaling, etc.

In 5G standard SSB are located repeatedly in frames with antenna beamforming using multiple steerable beams to support quick acquisition by UE in this environment.

As illustrated in FIG. 10, the ATSC 3.0 extended OFDM numerology 1001 supports higher frequency bands 1008. These IMT bands are outside broadcast band and have frequency (wavelength) that can support broadcast antenna beamforming steering on the transmit side with no adaptation. This to support transmit beamforming and steering to improve the efficiency of broadcast converged with the 5G unicast at these higher frequencies and small cell topologies.

Figure 18:
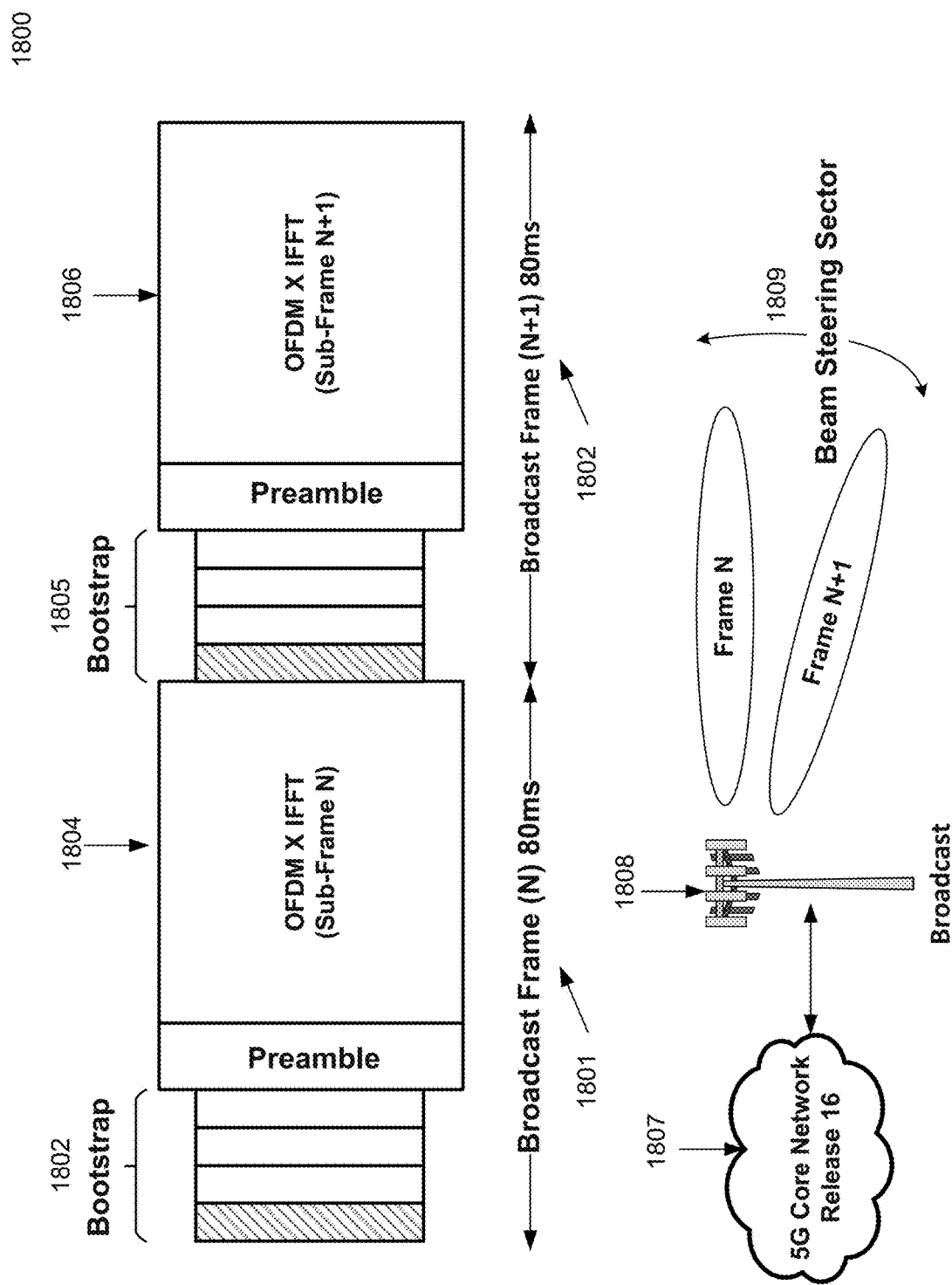
FIG. 18 illustrates an exemplary bootstrap enable broadcast antenna beam steering, according to some aspects/embodiments.

FIG. 18 illustrates an exemplary bootstrap enable broadcast antenna beam steering, according to some aspects/embodiments. A multiple broadcast antenna array in each sector 1808 of FIG. 18 forms a steerable beam in direction of the UE using one sector 1808. Some of the embodiments of this disclosure apply to broadcast transmit beamforming steering in a broadcast converged network.

The broadcast sector antenna array 1808 of FIG. 18 beam direction is determined by 5G core network 1807 using analytics, policy and information from the dual connected UE 1511 such as geographic location, which is tracked by network 1807 and used for paging, handover, etc. This information about UE is available in a converged broadcast unicast 5G network with cooperating schedulers of an MNO. The MNO is using trusted Non-3GPP access (broadcast) release 16 as previously discussed to integrate interwork broadcast in 5G core.

FIG. 18 depicts an example of extend bootstraps 1802, 1805 and frames 1804, 1806 in higher frequency IMT band 1008, according to some aspects/embodiments. The extended bootstraps have the properties to enable quick UE synchronization, discovery and low level signaling previously discussed. This can enable a UE to quickly access and follow a broadcast transmit beam that is steered on a frame boundary in the time domain, as will be discussed in a converged broadcast 5G network. The first symbol of each extended bootstrap 1802, 1805 provides initial synchronization and waveform discovery based on (Root+Seed) combination to support multiple waveform types.

According to some embodiments, the transmit broadcast frames 1801, 1802 are steered by network 1807 on a frame boundary basis from a specific sector 1808 as shown 1809 as a function of time with Frame N 1801 and frame N+1 1802 shown.

Several exemplary use cases will now be disclosed that can benefit from this intelligent broadcast transmit beam steering in a converged network such as 5G release 16 and dual connected UE 1511. These use cases are discussed in, for example, a trusted Non-3GPP access network (broadcast) cooperative convergence 5G network. First, broadcast beamforming steering is used to efficiently offload traffic from the unicast 5G network using intelligence in the 5G core network 1807. Next, the broadcast transmit antenna beam steering is used to multicast to a group of UE in a known area using intelligence 5G core network 1807. Finally, several broadcast beams form a single frequency network between two cell sectors in a known direction to create a broadcast hotspot were common data or entertainment is received using intelligence in 5G core network 1807.

These use cases can have transmit side beam steering dynamically on frame boundaries if improvements are used as a function of time by network 1807.

In some aspects/embodiments, these use cases combinations are discussed for broadcast transmit beamforming and steering. No special receiver antenna processing is used on broadcast UE 1513. However, receiver side antenna diversity 1513 is optional and independent and is not discussed.

Figure 19:
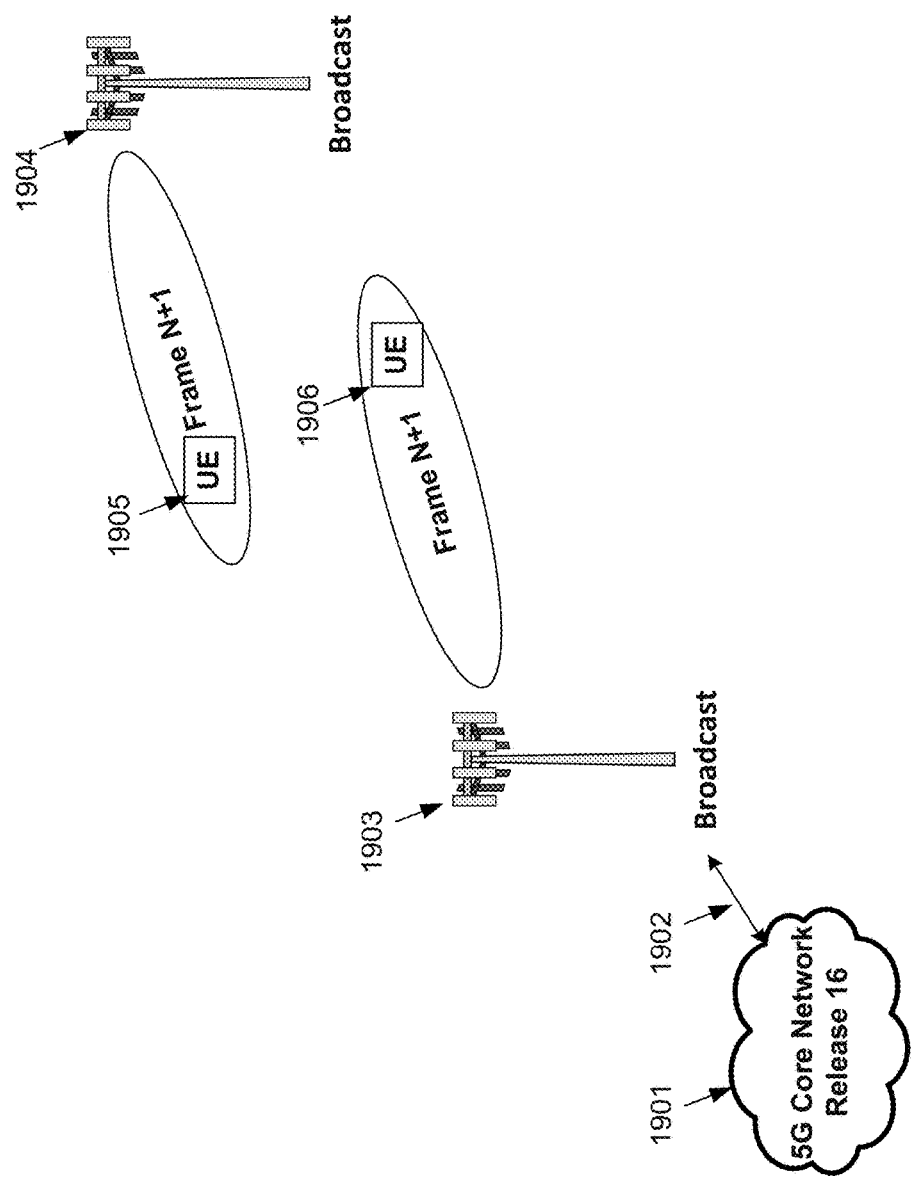
FIG. 19 illustrates another exemplary bootstrap enable broadcast antenna beam steering, according to some aspects/embodiments.

FIG. 19 illustrates an example of transmit beam steering using intelligence in 5G core network 1901, according to some aspects/embodiments. The broadcast cell sector antennas 1903, 1904 are used to offload 5G unicast traffic and mitigate inter-cell interference on the cell edge by directing beams in different directions at the instant in time. A transit beam can be steered in each sector on a frame boundary basis. The UEs 1905, 1906 each with separate traffic frame N+1 are being offloaded from 5G unicast network and the cell edge interference between cells (re-use1) are being mitigated spatially by direction of beam steering using intelligence network 1901.

According to some aspects/embodiments, the UEs 1905, 1906 could also represent a multicast group of UEs known to be in these areas requesting common data and/or entertainment. In some embodiments, the core network 1901 has the intelligence to make such offload decisions in line with the requirements for, for example, 5G TS 22.261 release 16 on multiple access networks section 6.3 and using dual connected UE 1511 previously discussed.

Figure 20:
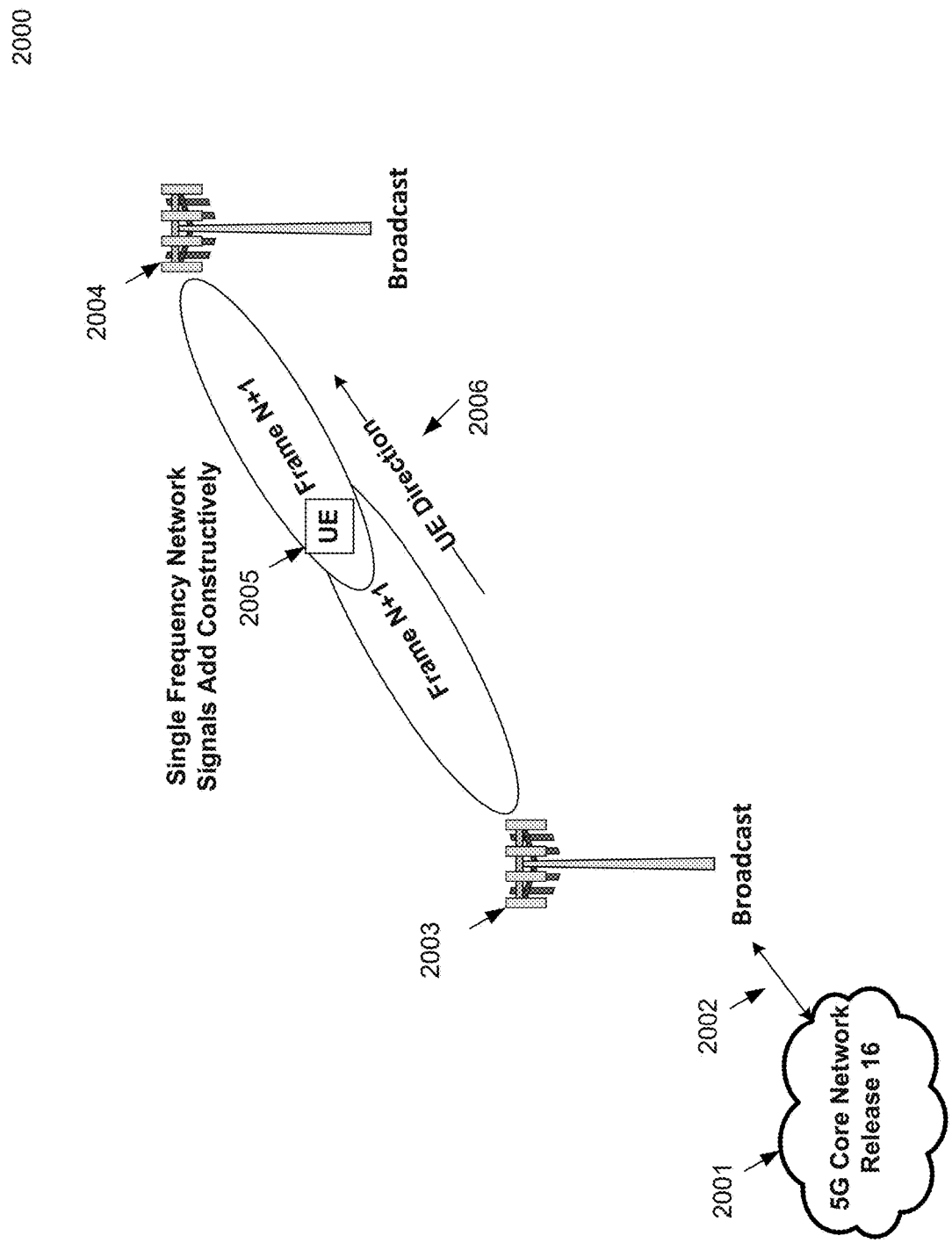
FIG. 20 illustrates another exemplary bootstrap enable broadcast antenna beam steering, according to some aspects/embodiments.

FIG. 20 illustrates an example of transmit beam steering using intelligence in 5G core network 2001, according to some aspects/embodiments. The 5G core network 2001 has the location of UE 2005 and the current direction 2006. The UE is moving towards the edge of cell 2003 in the direction of cell 2004. The network 2001 dynamically schedules the OFDM resources in these sectors 2003, 2004 to be coherent and form single frequency network in the area between the beams. The signal frequency network beams then add constructively at the UE 2005 increasing signal strength overlapping contours of the beams.

FIG. 20 could also be the first stage of a handover from cell 2003 to cell 2004 with the known direction of UE 2006 (known by network 2001). When the UE 2005 moves inside service area of cell 2004, a switch in network 2001 back to single broadcast beam of cell 2004 could be orchestrated to complete the seamless offload handover. The cells 2003, 2004 then operate independently being orchestrated by network 2001 on the next frame boundary.

The beam directions can change on a frame by frame basis on each cell sector and this is coordinated by the central location intelligence network 2001 in a cooperative broadcast 5G convergence.

Figure 21:
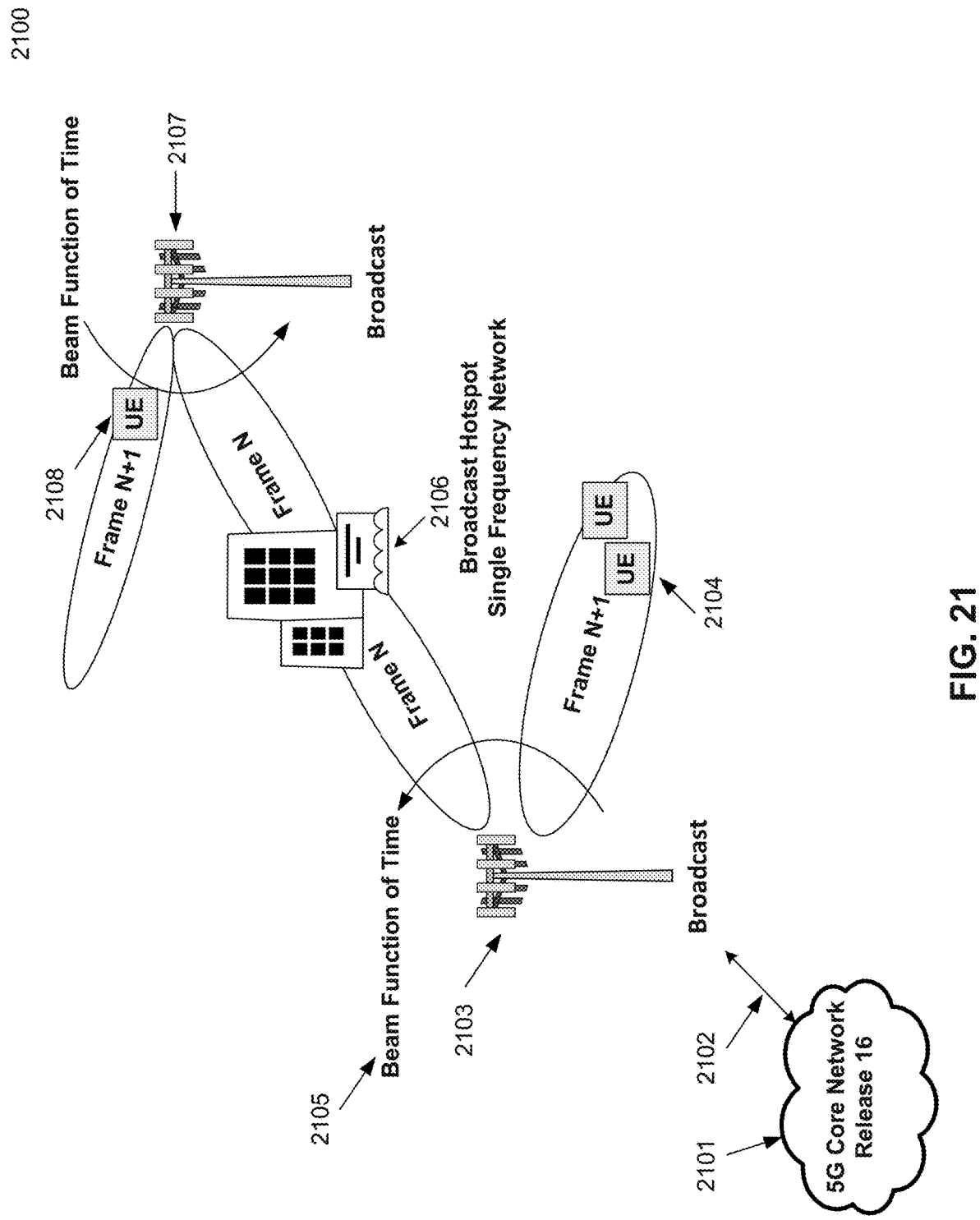
FIG. 21 illustrates another exemplary bootstrap enable broadcast antenna beam steering, according to some aspects/embodiments.

FIG. 21 illustrates an example of transmit beam steering using intelligence in 5G core network 2101 switching beams as a function of time, according to some aspects/embodiments. FIG. 21 illustrates two adjacent cells 2103, 2107 switching beams on a frame by frame basis as a function of time 2105 controlled by intelligence in 5G core network 2101.

In frame N, beams from both cells 2103 and 2107 can create a broadcast hotspot 2106 using network 2101 and by scheduling of OFDM resources to form single frequency network. This could be a geographic area with an event and where large numbers of UEs are detected by network 2101 requesting common entertainment or data that can be offloaded from 5G unicast network using intelligence network 2101 to efficiently support consumers and controlled loading congestion on 5G network with dual connectivity UE 1511.

The Frames N+1 from cells 2103 and 2107 at another point in time can carry independent traffic. The Frame N+1 is directed to UE 2108 unicast offload, and UE 2104 is a multicast group with common data requirements. Again, the physics and economics favor broadcast when common entertainment and/or data is used, and this can be orchestrated by intelligence in core network 2101.

These new use cases provide improvements over the legacy LTE broadcast method known as eMBMS, which is based on the legacy 4G LTE and core network. The 5G release 16 and new IP core network paradigm, known as a service-based-architecture (SBA) is real paradigm shift based on IT cloud principles.

Figure 22:
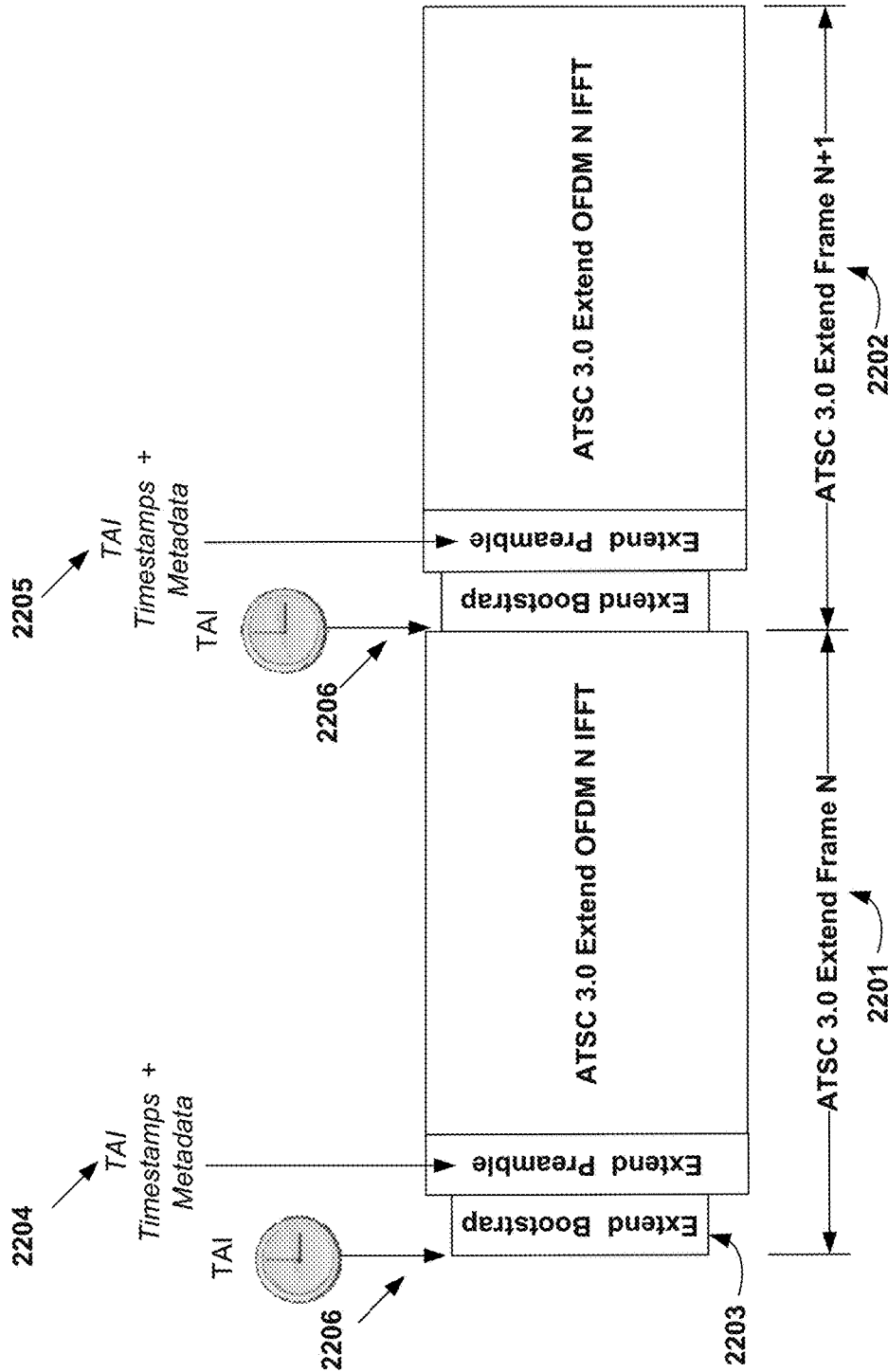
FIG. 22 illustrates exemplary broadcast TAI timestamps metadata receiver to establish NTP clock, according to some aspects/embodiments.

FIG. 22 illustrates a broader end to end broadcast broadband heterogeneous network architecture, according to some aspects/embodiments. For example, the requirements on network timing with media transport layer using ISO/IEC 23008-1 MPEG Media Transport (MMT) and MPEG Dynamic Adaptive Streaming over HTTP (DASH) is discussed.

A system architecture is disclosed, which is synergistic to the correlation of the frames of extended ATSC 3.0 broadcast and 5G frames previously discussed. This will result in an end to end architecture that abstracts the access networks for the flexible delivery and consumption of media and data objects using heterogeneous network in FIG. 25.

Figure 23:
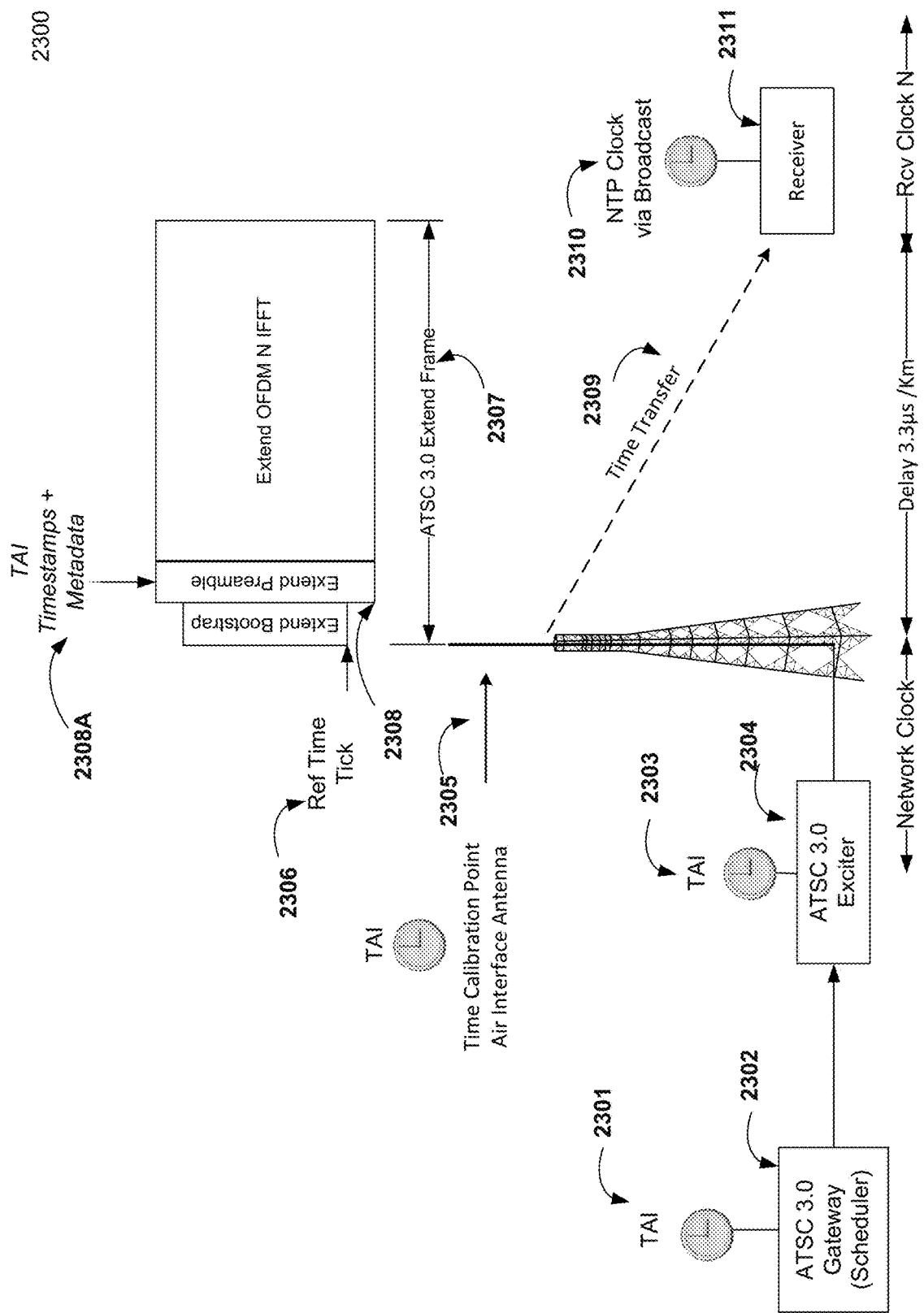
FIG. 23 illustrates other exemplary broadcast TAI timestamps metadata receiver to establish NTP clock, according to some aspects/embodiments.
Figure 24:
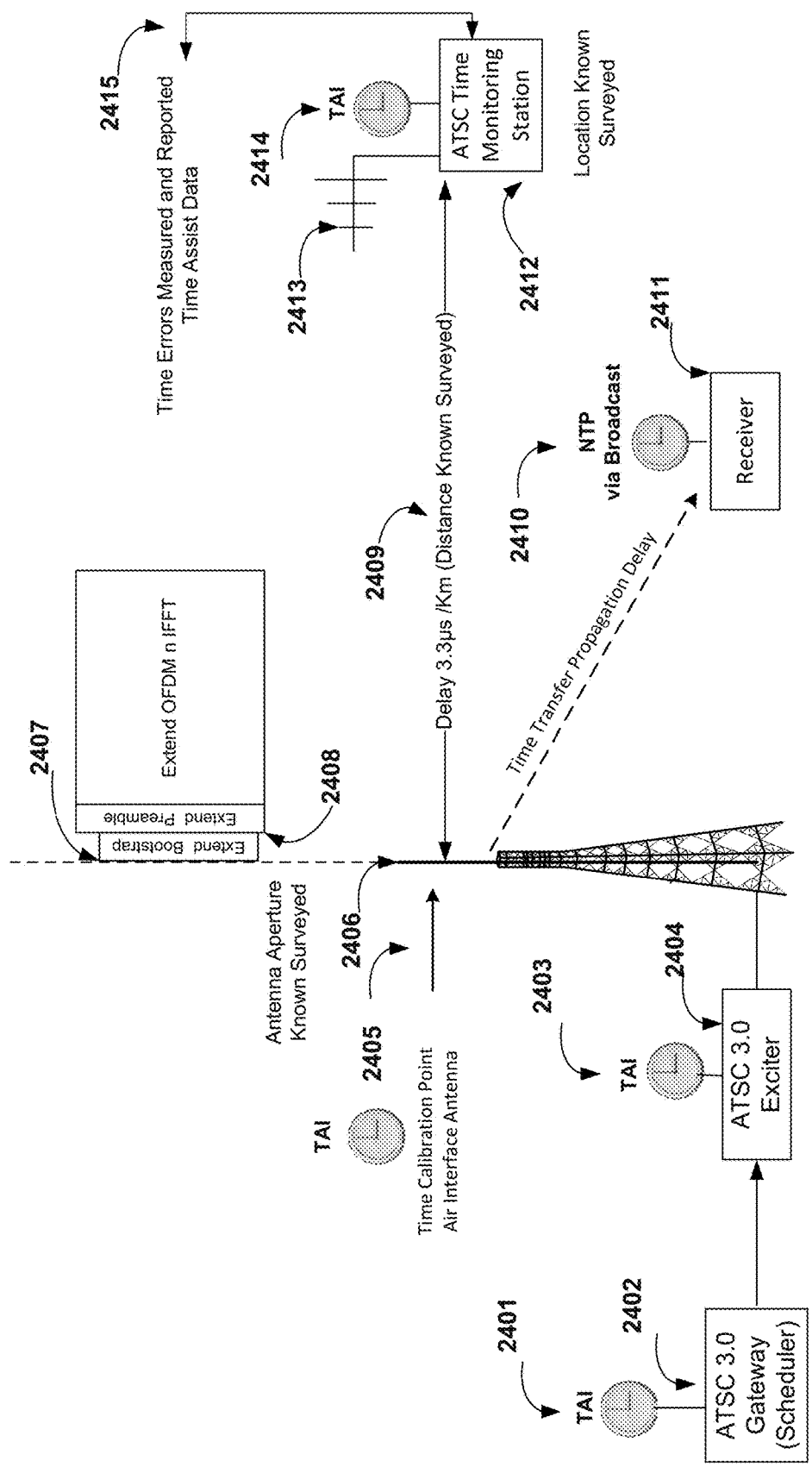
FIG. 24 illustrates other exemplary broadcast TAI timestamps metadata receiver to establish NTP clock, according to some aspects/embodiments.

FIG. 22, FIG. 23, FIG. 24 disclose a method for accurate time transfer using broadcast over the air (OTA) signal, according to some aspects/embodiments. The purpose is establishing a Network Time Protocol (NTP) clock at the UE. The ISO/IEC 23008-1 MMT standard uses an NTP clock available at both sender side (network) and receiver side (UE). However, ISO/IEC 23008-1 MMT standard is silent on how this clock is established. The NTP for upper layer timing can be derived from the network TAI clock.

The time transfer using L1 broadcast physical layer extended ATSC 3.0 is a reliable NTP clock that can be quickly established without requiring broadband access by UE to internet based NTP servers.

This method of time transfer can be more accurate than internet NTP servers. It can also support broadcast stand-alone services (no broadband) on UE. It is further recognized that using time transfer by broadcast can have other applications.

The use case in FIG. 25 of a broadcast broadband heterogeneous network will be discussed once the establishment of NTP clock on UE, a prerequisite using time transfer using broadcast L1 layer, is first disclosed.

FIG. 22 depicts the ATSC 3.0 extended frames 2201, 2202 and extended bootstrap 2203 previously discussed. The extended bootstraps 2203 are correlated aligned with TAI clocks 2206 at the air interface of the broadcast antenna (calibration point) time transfer as shown in FIG. 23. The post bootstrap L1 extended preambles 2204, 2205 now carry signaling to enable time transfer. The TAI timestamps and metadata signaling 2204, 2205 is correlated to the instant the first sample F(s) of first symbol of bootstrap is at the air interface of broadcast antenna (calibration point) as will be shown.

FIG. 23 shows a method for time transfer 2309 using broadcast L1 physical layer extended ATSC 3.0 frame 2307 to enable broadcast UE 2311 to establish an NTP clock 2310, according to some aspects/embodiments. The extend L1 preamble 2308 has TAI timestamps and metadata 2308 A with values calibrated at the air interface broadcast antenna 2305 at the instant the first sample F(s) of first symbol of extended bootstrap is at air interface 2306.

According to some examples, it is the responsibility of broadcast physical layer scheduler 2302, which has the network TAI clock 2301, to inserts TAI timestamps and metadata that will be broadcast by ATSC 3.0 exciter 2304 with TAI clock 2303 and be accurate at calibration point 2305. The transport delay physical layer is constant between scheduler 2302, exciter 2304 to calibration point 2305 and can be calculated or measured when system is provisioned. This constant delay can be used to establish a broadcast single frequency network (SFN) and is leveraged now for time transfer 2309 using broadcast physical layer.

According to some examples, the inaccuracy at the receiver receiving broadcast TAI timestamps and metadata is the distance of UE 2311 from calibration point 2305. It is known that a radio wave propagates at the speed of light and this is ~3.3 µs per kilometer. It is noted this time transfer accuracy is superior to that obtained from internet NTP servers.

It is realized in FIG. 23 that the network can be made of discrete hardware components 2302, 2304 or these can be functions in a virtualized network as is envisioned for broadcast 5G convergence.

The TAI timestamps inserted in L1 preamble 2308 can be the TAI 80 bits with 48 bits seconds and 32 bits sub-seconds established at TAI epoch. The metadata can include UTC/NTP offset (leap seconds) 6 bits, the UTC/NTP (time zone offset) 7 bits, and 1 bit to signal daylight savings time is active. However, it is noted that other metadata is possible.

The metadata is with reference to the geographic location of broadcast station emitted signal, according to some aspects/embodiments.

The UE 2311 uses the broadcast TAI timestamps and metadata 2308A to convert this to a 64 bit NTP clock 32 bit second and 32 bit sub-seconds at the receiver. Time transfer using L1 broadcast physical layer can establish time rapidly and ubiquitously in a wide broadcast area. That is more accurate than internet NTP servers and can enable broadcast stand-alone reception without broadband for certain device types.

In some examples, there is one constraint that the calibrated transmitted TAI timestamps and metadata can not be converted to correct civil time (UTC wall clock) at the UE location if desired as an option. Since, broadcast at high power signal and from an antenna at high heights, the signal can propagate large distances and can cross a time zone boundary and then received in a large country. The correct time zone at UE location is used to calculate UTC at UE 2311 and the metadata sent L1 preamble is for time zone of the transmitter station. The time zone at UE 2311 is responsibility of other layers at UE if UTC is desired. However, broadcast TAI timestamps and metadata can be used to establish the NTP clock UE and used to decode and present content on NTP time line as well be discussed in FIG. 25.

FIG. 24 depicts the time transfer similar to FIG. 23 but adds a new ATSC Time Monitoring Station 2412 that can validate broadcast time transfer accuracy, according to some aspects/embodiments. Also, the monitoring station can send assistance data back to the network scheduler 2402 to increase the accuracy and stability.

Figure 25:
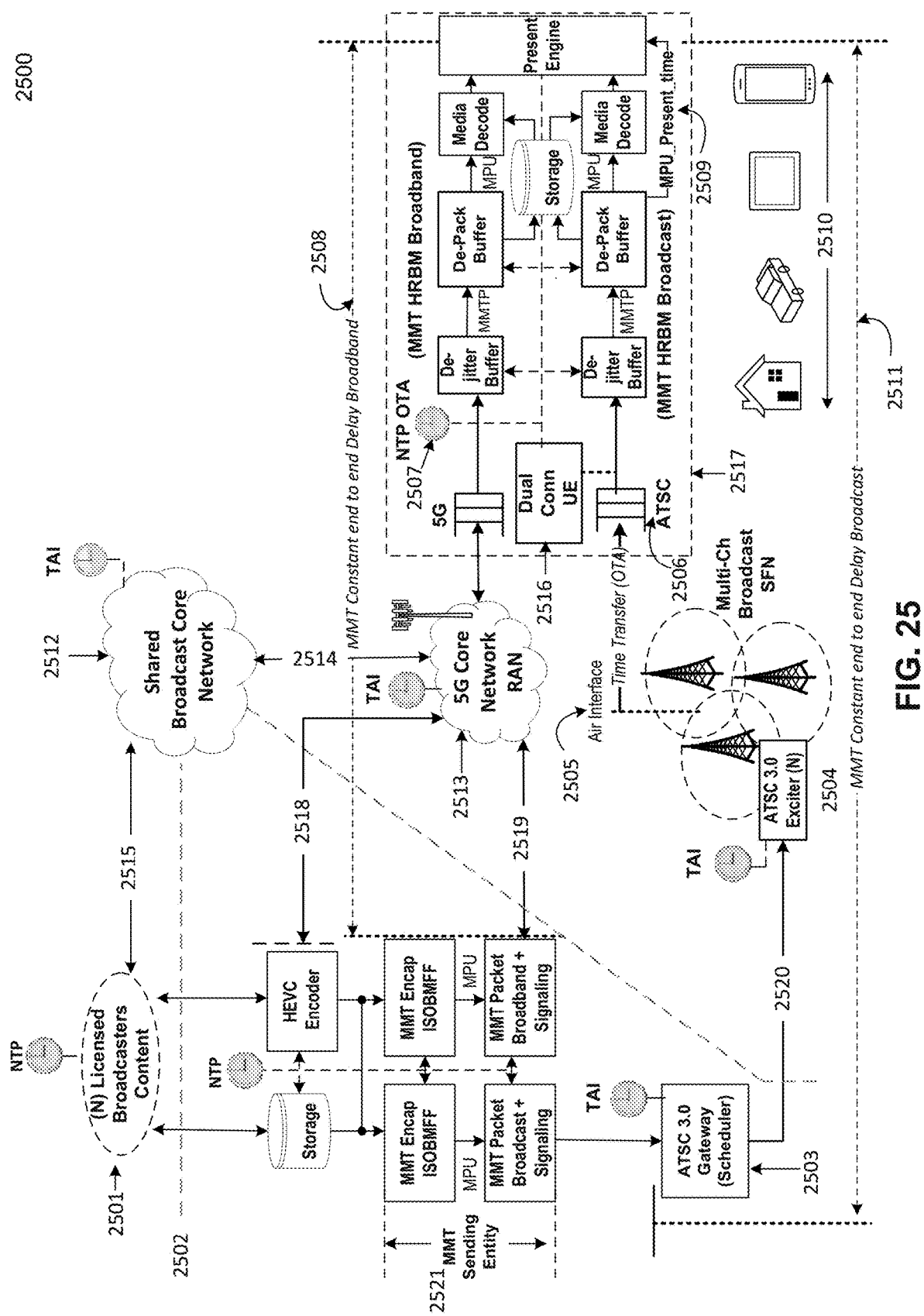
FIG. 25 illustrates hybrid broadcast broadband network timing, according to some aspects/embodiments.

The monitoring of network timing can be part of any network that depends on Frequency, Phase and Time for its operation such as ATSC 3.0 extend broadcast and 5G as will be shown and discussed in FIG. 25.

The method of FIG. 24 for time transfer remains the same as discussed in FIG. 23 and the operation of ATSC time monitoring station 2412 is discussed in detail. Monitoring station 2412 is at a known surveyed geographic location. The broadcast antenna aperture 2406 is also surveyed and its geographic location and height is known. Because the distance between antenna aperture 2406 and the receive antenna 2413 is known, as is the speed of light, ATSC time monitoring station internal delays are known and can be compensated for in the time measurement based on TAI clock 2414 availability.

At the monitoring station 2412, at the instant the first sample F(s) of the first symbol of extend bootstrap 2407 is received, the TAI time value received in extended L1 preamble 2408 and the local TAI clock are compared.

Given the distance from antenna 2406 to antenna 2413 (and the known speed of light), the monitoring station 2412 calculates the difference in TAI values observed after compensating for internal delays, and this indicates the magnitude of error at the calibration point 2405 of TAI time being broadcasted.

The measurement can be reported 2415 as part of normal network monitoring and or used as time assistance feedback data to ensure calibrated TAI timestamps values are inserted in L1 preamble 2408 by scheduler 2402 and arrive at calibration point 2405 at the correct instant and are calibrated. This measurement of TAI would also be part of the initial provision of the network. However, long-term monitoring and assistance data is useful to network operator to ensure timing integrity of network.

FIG. 25 illustrates a synergistic extension of FIG. 15 ATSC 3.0 time-aligned frames w/SFN count convergence broadcast and broadband (5G) with dual connected UE 1511, according to some aspects/embodiments.

FIG. 25 introduces an upper layer application transport ISO/IEC 23800-1 MPEG Media Transport (MMT) Mobile. This is to enable more flexible broadcast broadband 5G convergence use cases using MMT and NTP timestamps.

However, the NTP clock is first available at transmit nodes and at the UE 2516 using broadcast time transfer as described in FIG. 23 for the UE NTP clock.

The time calibration point is the air interface 2505, and scheduler 2503 inserts TAI timestamps and metadata in L1 preamble and sends to ATSC 3.0 exciter 2504 over 2520. The broadcast time transfer occurs over the air (OTA) and is received 2506 at ATSC 3.0 receiver. The UE 2516 uses TAI timestamps and metadata and then converts to NTP as shown in NTP (OTA) 2507.

In FIG. 25, the TAI clock is shown available at the entities 2512, 2513, 2503, 2504 as previously discussed. The NTP clock is shown available at the entities 2501, 2521 and is then established at 2507 using the broadcast physical layer for time transfer as previously discussed. The broadcast time calibration 2505 point is shown as is reception of TAI timestamps and metadata at ATSC receiver 2506 and then converted to NTP 2507 for use of MMT processing chains 2517 at UE 2516.

The timing of physical layer frames uses a TAI clock and this provides continuous cadence of physical layer frames. MMT application layer transport (above IP layer) timing is based on NTP and this is synergistic but independent of the physical layer frame timing previous discussed FIG. 15.

Stated another way the physical layer frames occur at a known cadence using TAI. The media is encapsulated in MMT application layer transport as objects using NTP and can be adjusted for presentation on MMT processing chains 2517 independent of physical layer used for transport (abstraction). Therefore, each MMT media object have flexibility to be advanced or delayed in time using NTP independent of transport used. This MMT abstraction is to enable flexible use cases with tight media timing on a NTP presentation timeline established at the UE 2516 under control of MMT sending entity 2521.

NTP timestamps are used by MMT for managing both the media transport delivery and the presentation of media or data objects on UE 2516. These objects are transmitted from broadcast SFN 2504 and/or 5G network 2513 and are received by UE 2516 and are processed by the MMT receiver chain 2517.

However, it is understood that MMT will work over any IP access network. Including Wi-Fi in the home connected to a broadband service provider and controlled by network 2512. The devices 2510 illustrate the home as one example. A home gateway device could be controlled by network 2512 in addition to or instead of the 5G IP network shown. FIG. 25 illustrates broadcast 2504 and 5G 2513 as the IP access networks used for MMT.

Content 2515 from licensed broadcaster 2501 using shared broadcast core network 2512 via interface 2502 is sent into network 2512. The content is first encoded and encapsulated into ISOBMFF media objects (MPU) that are encapsulated into MMT packets 2514 for broadcast or broadband delivery with MMT signaling controlled by the MMT sending entity 2521 shown.

The MMT timing model abstracts the IP access networks from the UE 2516. The abstraction is done by the MMT delivery protocol controlling 2517 of MMT receiver chains. MMT protocol guarantees a constant delay for a MMT packet for either broadband 2508 or broadcast 2511 access networks. The MMT Hypothetical Receiver Buffer Model (HRBM) 2517 is controlled by MMT and NTP timestamps to establish constant transport delay abstracting deliver access networks.

The MMT timing model details can be found in ISO/IEC 23008-1 MMT standard and in ISO/IEC 23008-13 MMT Implementation Guidelines, which are incorporated herein by reference in their entirety.

Moreover, each MMT media object (MPU) is assigned a globally unique identifier consisting of MPU asset_id number and MPU sequence number by MMT sending entity 2521.

The MMT abstraction enables tight orchestration also for media objects (MPU) previously transported and currently stored in cache on UE 2516. MMT objects (MPU) are presented on a defined NTP timeline using MPU timestamps 2509 and unique asset_id and sequence number assigned each object (MPU).

The broadcast 5G convergence as shown in FIG. 25 can enable many use cases in addition to those discussed. One example can include using Information Centric Networking (ICN), also known as content centric networking, in a 5G network. ICN is an approach to evolve the Internet infrastructure to directly support data-centric and location independent communications by introducing named data as a core Internet principle. The unique MPU asset_id and sequence number used in MMT to identify content is in this spirit and therefore synergistic with ICN in future.

In FIG. 25 the entities in networks 2512 and 2513 can also be implemented as network functions using SDN/NFV as envisioned for 5G release 16.

The interface 2518, Non-3GGP interworking between broadcast core and 5G Core network, is for offload traffic from 5G network. The interface 2519 uses network exposure function NEF in 5G core to provide unicast services to licensed broadcasters 2501 using network 2512 for 5G release 16.

Figure 26:
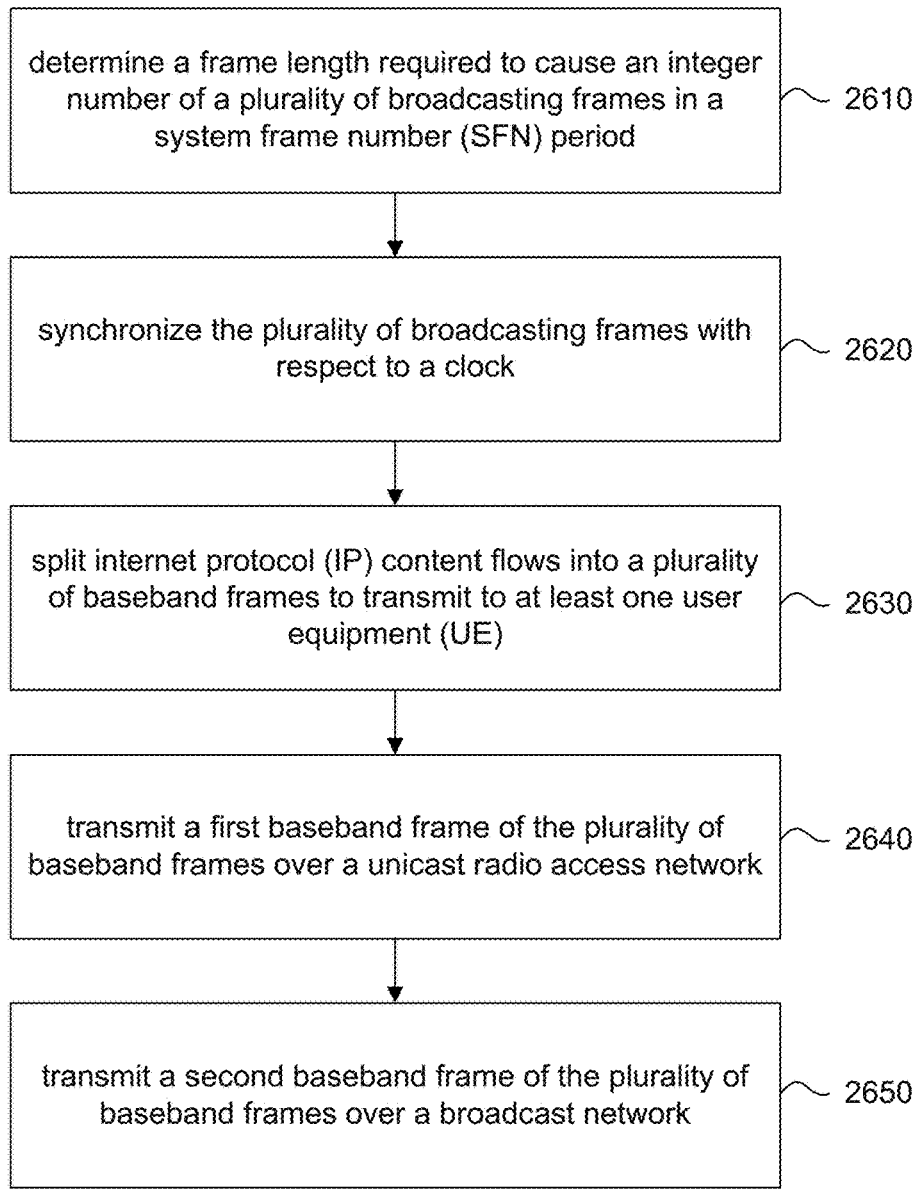
FIG. 26 illustrates a flow chart of method steps for providing convergence of 5G and ATSC 3.0 broadcast, according to some aspects/embodiments.

FIG. 26 illustrates method steps for providing convergence of 5G and ATSC 3.0 broadcast, according to some aspects/embodiments. The flow chart 2600 starts at step 2610. At step 2610, a frame length used to cause an integer number of plurality of broadcasting frames according to ATSC 3.0 standards in a system frame number (SFN) period can be determined as described above. At step 2620, the plurality of broadcasting frames can be synchronized as described above with respect to a clock, which can be a TAI clock. At step 2630, as described above, content for distribution or transmission to the user equipment (UE) and received as IP content flows can be split into a plurality of baseband frames. The baseband frames are transmitted to the UE over an ATSC 3.0 broadcast network or 5G unicast network. At step 2640, a first baseband frame of the plurality of baseband frames can be transmitted to the UE over the 5G unicast network as described above. Based on assessment of the traffic and congestion situation or for any other reasons, at step 2650, the second baseband frame of the plurality of baseband frames can be transmitted to the UE over the ATSC 3.0 broadcast network. As described above, since the IP content flows is split into a plurality of baseband frames, a first content in the first baseband frame and a second content in the second baseband frame are associated with each other. Accordingly, due to convergence of the 5G and ATSC 3.0, the UE can receive the content over the 5G and ATSC 3.0 network.

In conclusion ATSC 3.0 physical layer broadcast standard is extended with new OFDM numerology, L1 signaling and frame structure aligned with 5G. The convergence is then complimented with MMT application layer transport for media objects (MPU) for tight orchestration on a NTP presentation time line independent of transport access network. This is done to enable improved broadcast mobility and convergence use cases 5G release 16 as a Non-3GPP access network.

What is claimed is:

1. A method, comprising:
splitting interne protocol (IP) content flows into a plurality of baseband frames to transmit to at least one user equipment (UE);
transmitting a first baseband frame of the plurality of baseband frames over a unicast radio access network, wherein the first baseband frame is aligned with respect to a clock and comprises a first system frame number (SFN); and
transmitting a second baseband frame of the plurality of baseband frames over a broadcast network, wherein the second baseband frame is aligned with respect to the clock and is time aligned with the first baseband frame, wherein the second baseband frame comprises a second SFN that is correlated with the first SFN of the first baseband frame, and
wherein a second content in the second baseband frame is associated with a first content in the first baseband frame.

2. The method of claim 1, wherein the transmitting the first baseband frame comprises transmitting the first content that comprises an enhancement layer content associated with the second content.

3. The method of claim 1, wherein the clock comprises an international atomic time (TAI) network clock.

4. The method of claim 1, further comprising:
inserting a timestamp and associated metadata within an extended preamble of the second baseband frame, wherein the timestamp is based on international atomic time (TAI).

5. The method of claim 1, further comprising:
determining a frame length to cause an integer number of a plurality of broadcasting frames in an SFN period, wherein the SFN period is 10,240 ms and the frame length is 160 ms.

6. The method of claim 1, further comprising:
determining a frame length to cause an integer number of a plurality of broadcasting frames in an SFN period, wherein the SFN period is 10,240 ms and the frame length is 80 ms.

7. The method of claim 1, wherein the transmitting the second baseband frame over the broadcast network comprises transmitting the second baseband frame over an Advanced Television Systems Committee (ATSC) 3.0 standard network, and wherein the transmitting the first baseband frame over the unicast radio access network comprises transmitting the first baseband frame over a 5G wireless network.

8. The method of claim 7, further comprising coordinating the 5G wireless network and the ATSC 3.0 standard network to generate the first baseband frame and the second baseband frame.

9. The method of claim 7, wherein the splitting the IP content flows into the plurality of baseband frames that comprises offloading traffic from the 5G wireless network to the ATSC 3.0 standard network.

10. An apparatus, comprising:
a first receiver configured to receive a first frame, wherein the first frame is generated at a unicast radio access network, is aligned with respect to a clock, and comprises a first system frame number (SFN);

a second receiver configured to receive a second frame, wherein the second frame is generated at a broadcast network, is aligned with respect to the clock, is time aligned with respect to the first frame, and comprises a second SFN that is correlated with the first SFN of the first frame; and a processor configured to:
determine a first content from the first frame;
determine a second content from the second frame; and
associate the second content with the first content.

11. The apparatus of claim 10, wherein the first receiver comprises a 3rd Generation Partnership Project (3GPP) receiver and the second receiver comprises a non-3GPP receiver.

12. The apparatus of claim 10, wherein the first content comprises an enhancement layer content associated with the second content.

13. The apparatus of claim 10, wherein the clock comprises an international atomic time (TAI) network clock.

14. The apparatus of claim 10, wherein the broadcast network comprises an Advanced Television Systems Committee (ATSC) 3.0 standard network, and wherein the unicast radio access network comprises a 5G wireless network.

15. The apparatus of claim 14, wherein the processor is further configured to coordinate the 5G wireless network and the ATSC 3.0 standard network based on a timestamp and associated metadata within an extended preamble of the second frame.

16. The apparatus of claim 15, wherein the processor is further configured to establish a
second clock based on the timestamp and the associated metadata.

17. A communication system, comprising:
a scheduler of a wireless radio access network configured to generate a first frame, wherein the first frame is aligned with respect to a clock and comprises a first system frame number (SFN);
a transmitter of the wireless radio access network configured to transmit the first frame to a user equipment (UE);
a scheduler of a broadcast network configured to generate a second frame, wherein the second frame is aligned with respect to the clock, is time aligned with respect to the first frame, and comprises a second SFN that is correlated with the first SFN of the first frame; and
a transmitter of the broadcast network configured to transmit the second frame to the UE,
wherein the first frame comprises first content and the second frame comprises second content, and
wherein the second content is associated with the first content.

18. The communication system of claim 17, wherein the clock comprises an international atomic time (TAI) network clock.

19. The communication system of claim 17, wherein the broadcast network comprises an Advanced Television Systems Committee (ATSC) 3.0 standard network, and wherein the unicast radio access network comprises a 5G wireless network.

20. The communication system of claim 19, wherein the scheduler of the ATSC 3.0 standard network is further configured to coordinate the 5G wireless network and the ATSC 3.0 standard network based on a timestamp and associated metadata within an extended preamble of the second frame.

* * * * *